US012614187B2

(12) United States Patent
Thiel

(10) Patent No.: US 12,614,187 B2
(45) Date of Patent: Apr. 28, 2026

(54) ESCALATION MANAGEMENT AND JOURNEY MINING

(71) Applicant: Pointillist, Inc., Boston, MA (US)

(72) Inventor: Will Thiel, Malden, MA (US)

( * ) Notice: Subject to any disclaimer, the term of this patent is extended or adjusted under 35 U.S.C. 154(b) by 0 days.

(21) Appl. No.: 17/130,125

(22) Filed: Dec. 22, 2020

(65) Prior Publication Data

US 2025/0069011 A1     Feb. 27, 2025

(51) Int. Cl.
| | |
|---|---|
| *G06Q 10/00* | (2026.01) |
| *G06F 16/2455* | (2019.01) |
| *G06F 16/248* | (2019.01) |
| *G06Q 10/0635* | (2023.01) |
| *G06Q 10/0637* | (2023.01) |
| *G06Q 10/10* | (2023.01) |
| *G06Q 10/101* | (2023.01) |
| *G06Q 30/01* | (2023.01) |
| *G06Q 10/0639* | (2023.01) |

(52) U.S. Cl.
CPC ......... *G06Q 30/01* (2013.01); *G06F 16/2455* (2019.01); *G06F 16/248* (2019.01); *G06Q 10/0635* (2013.01); *G06Q 10/0637* (2013.01); *G06Q 10/101* (2013.01); *G06Q 10/103* (2013.01); *G06Q 10/06393* (2013.01)

(58) Field of Classification Search
CPC ........... G06Q 10/0635; G06Q 10/0637; G06Q 10/101; G06Q 10/103; G06Q 10/06393; G06Q 10/06395; G06Q 10/00; G06Q 10/02; G06Q 10/06; G06Q 10/10; G06Q 30/02; G06F 16/2455; G06F 16/248; G05B 2219/31357
See application file for complete search history.

(56) References Cited

U.S. PATENT DOCUMENTS

| | | | | |
|---|---|---|---|---|
| 8,214,238 B1 * | 7/2012 | Fairfield | ............ | G06Q 30/0203 |
| | | | | 705/7.29 |
| 9,848,008 B2 * | 12/2017 | Chauhan | .............. | G06F 3/0484 |
| 10,243,970 B2 * | 3/2019 | Muddu | .............. | H04L 41/0893 |

(Continued)

FOREIGN PATENT DOCUMENTS

| | | |
|---|---|---|
| JP | 2016038822 A | 3/2016 |
| JP | 2020144857 A | 9/2020 |
| WO | 20180122642 A1 | 7/2018 |

OTHER PUBLICATIONS

Doloi, Hemanta Kumar. "Understanding stakeholders' perspective of cost estimation in project management." International journal of project management 29.5 (2011): 622-636. (Year: 2011).*

(Continued)

*Primary Examiner* — Joseph M Waesco

(57)     ABSTRACT

The journeys and/or timelines of multiple customers may be used in escalation management and/or journey mining. An event of interest, pertaining to an issue or an incident, on a timeline may be used in the escalation management and/or journey mining. Escalation management is directed to addressing and resolving incidents, problems, and customer situations which could result in a high level of customer dissatisfaction or damage to a service provider's reputation, using the appropriate response and/or resources. Journey mining is directed to using patterns across customers and their journeys to determine where things in the journey went differently than what was expected.

12 Claims, 14 Drawing Sheets

200

(56)           References Cited

U.S. PATENT DOCUMENTS

| | | | |
|---|---|---|---|
| 2010/0153156 A1* | 6/2010 | Guinta | G06Q 10/0635 706/54 |
| 2012/0030123 A1* | 2/2012 | Ocko | G07F 17/3234 705/304 |
| 2015/0381801 A1* | 12/2015 | Rajakumar | H04M 3/2281 379/88.01 |
| 2016/0103559 A1* | 4/2016 | Maheshwari | G06F 3/0481 715/738 |
| 2016/0103887 A1* | 4/2016 | Fletcher | H04L 41/069 707/722 |
| 2016/0103888 A1* | 4/2016 | Fletcher | H04L 43/04 707/722 |
| 2016/0103908 A1* | 4/2016 | Fletcher | G06F 3/04842 707/722 |
| 2016/0104093 A1* | 4/2016 | Fletcher | G06Q 10/06393 705/7.39 |
| 2016/0105325 A1* | 4/2016 | Fletcher | G06F 3/0482 715/737 |
| 2016/0266752 A1* | 9/2016 | Wu | G06F 16/904 |
| 2016/0292611 A1* | 10/2016 | Boe | G06Q 10/06393 |
| 2016/0294606 A1* | 10/2016 | Puri | G06Q 10/06393 |
| 2017/0083585 A1* | 3/2017 | Chen | G06F 11/3409 |
| 2018/0032512 A1* | 2/2018 | Oliner | G06F 16/41 |
| 2018/0095621 A1* | 4/2018 | Ryan | G06F 3/04842 |
| 2018/0129390 A1 | 5/2018 | Wu et al. | |
| 2019/0334764 A1* | 10/2019 | Chor | G06F 11/0793 |
| 2020/0202472 A1* | 6/2020 | Barak | H04W 4/021 |
| 2020/0265483 A1 | 8/2020 | Tortoriello et al. | |
| 2023/0139000 A1* | 5/2023 | Apger | G06F 3/0482 726/1 |

OTHER PUBLICATIONS

International Search Report and Written Opinion issued in co-pending PCT application No. PCT/US2021/064803 mailed on May 3, 2022.

* cited by examiner

200

Receive journey selection — 410

Initiate analysis on journey that was selected,
such as analyze one or more customer timelines — 420

Run analysis — 430

Output results of analysis
(e.g., to user interface, to graphical user interface, etc.) — 440

Update / adjust output and/or procedures based on results of analysis — 450

Monitor changes — 460

400

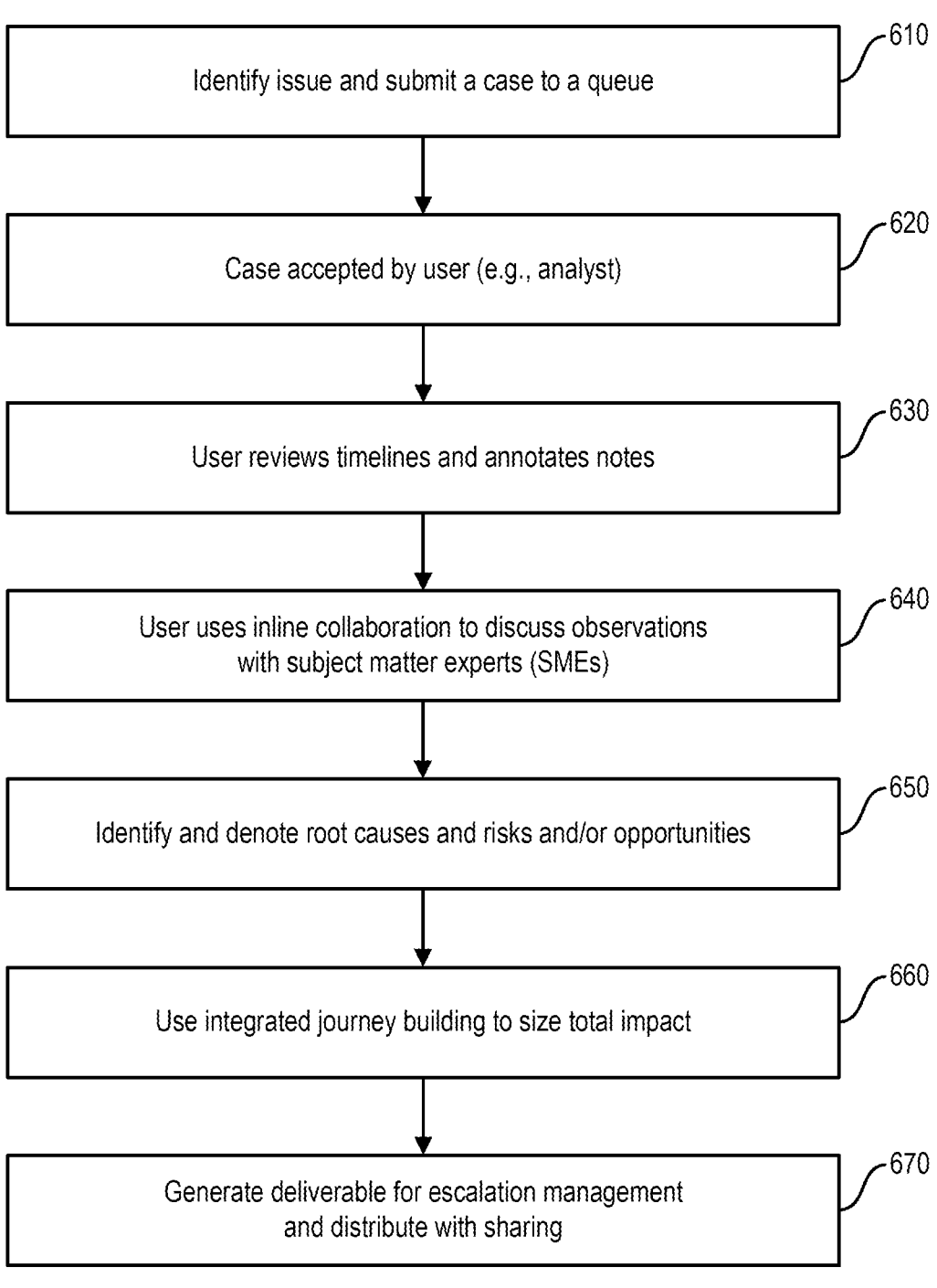

Identify issue and submit a case to a queue　610

Case accepted by user (e.g., analyst)　620

User reviews timelines and annotates notes　630

User uses inline collaboration to discuss observations with subject matter experts (SMEs)　640

Identify and denote root causes and risks and/or opportunities　650

Use integrated journey building to size total impact　660

Generate deliverable for escalation management and distribute with sharing　670

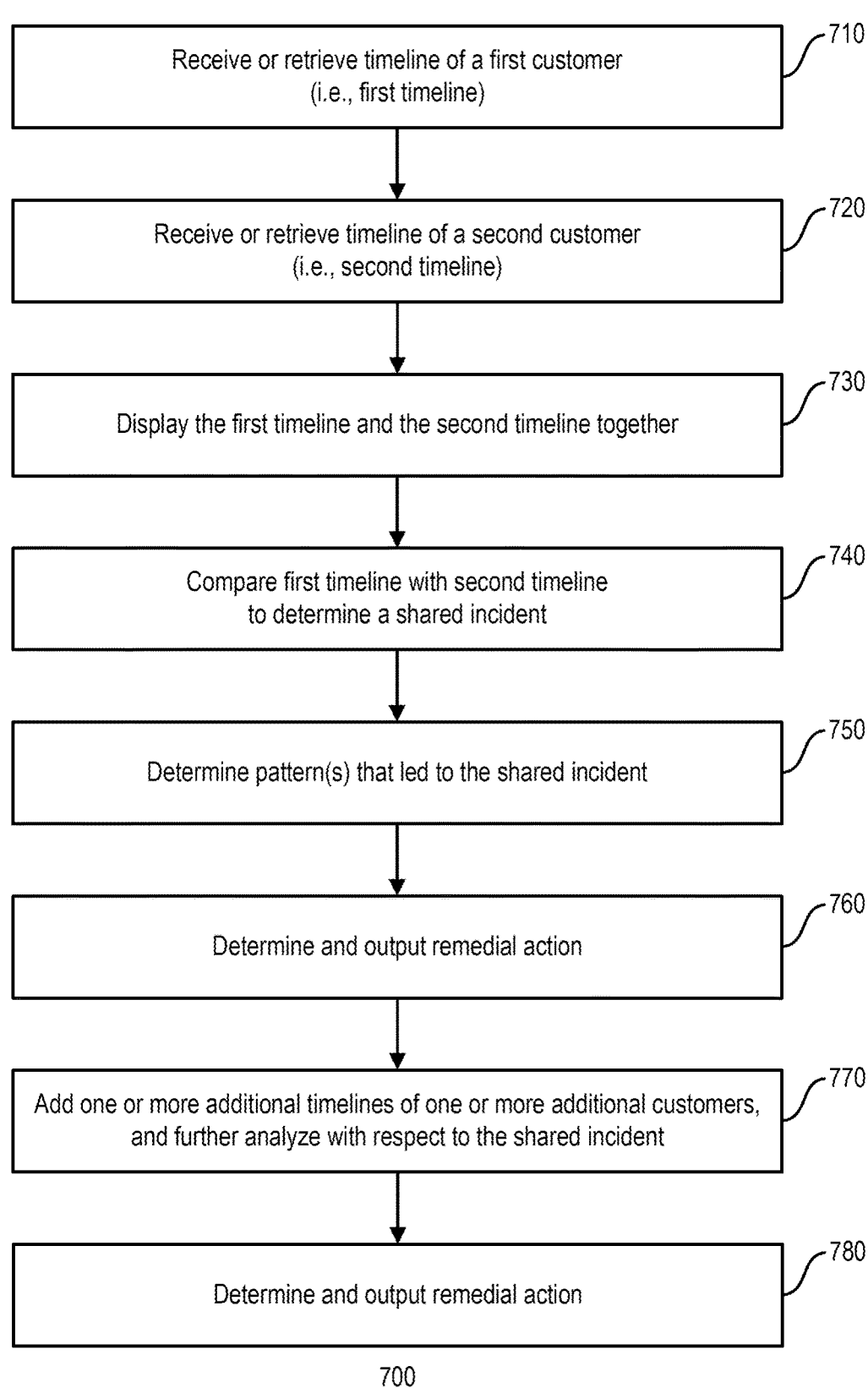

710 Receive or retrieve timeline of a first customer
(i.e., first timeline)

720 Receive or retrieve timeline of a second customer
(i.e., second timeline)

730 Display the first timeline and the second timeline together

740 Compare first timeline with second timeline
to determine a shared incident

750 Determine pattern(s) that led to the shared incident

760 Determine and output remedial action

770 Add one or more additional timelines of one or more additional customers,
and further analyze with respect to the shared incident 780 Determine and output remedial action

ESCALATION MANAGEMENT AND JOURNEY MINING

BACKGROUND

In any customer-focused industry the success of a business depends upon the entirety of the customer journey. Today, data points representing events along a customer journey may be recorded in a database, and these data points can be aggregated to measure key performance indicators (KPIs) essential to assessing enterprise performance, but the root causes driving those KPIs cannot be directly ascertained from the underlying data. This is because root causes are contained within journeys (sets of heterogeneous, interrelated events unfolding over time), and simple aggregations of data points, and even machine learning upon those data points, cannot penetrate the complexity of true journey analysis.

Journeys can be defined not only by if a customer saw an ad, or when a customer visited a website, or what a customer purchased, or even who a customer is, but can be defined as everything the customer has ever done, how those events are related to each other in time, and who or what else participated in those events. Analyzing journeys requires analyzing all of a customer's interactions simultaneously—including the gaps between events and the state of the customer at the time they participated in those events. Communicating and understanding journeys require new ways of visualizing and interacting with data which convey this enormous complexity in a form which is intuitive to non-analytical users.

Conventional systems are unable to deliver such functions. While marketing teams can monitor KPIs, track trends, "slice and dice" results on a current snapshot or aggregation of the marketing or other customer-related data, this offers only a limited (and often out-of-date) view of a limited subset of available data. For instance, they know what total sales per period are and drill down in multiple dimensions, they can identify who are the most profitable customers or follow, for example, the Net Promoter Score (NPS); however, it is very difficult, if not impossible in multi-channel and multi-process organization, to determine the customer experiences (interactions and other events that shape customers' perceptions of the brand) that explain trends or variation in these metrics. In reality, each customer traces a unique path through the organization—and those pathways lead to different results. Understanding these paths and their influence on the metric requires new capabilities to shape the customer journey and maximize the business performance.

By transcending the silos retaining data in particular channels, processes or organizations, and by preserving the integrity of each customer journey, a new world of questioning becomes possible. For instance, in addition to knowing what the Net Promoter Score of the company is, marketers may be able to effectively understand how customer interactions influences the NPS and identify where they should take action and reshape the customer experience for improving the overall score.

Accordingly, because customer journeys are behind every marketing metric and the business outcomes for which marketing teams are responsible, marketing teams need a solution specialized in revealing the story behind each metric, what drivers influence it and how to shape the customer journey to maximize business value.

Escalation management is a process that deals with incidents, problems, and customer situations which could result in a high level of customer dissatisfaction or damage to a service provider's reputation. Escalation management is directed to addressing and resolving these types of problems and issues at the right level and with the right resources. Escalation management and opportunity investigation (e.g., NPS elevation) rely on data (e.g., customer history, call transcripts, natural language processing, etc.) and data quality. Currently, escalation management and opportunity investigation (e.g., NPS elevation) are difficult to successfully and efficiently achieve. Generating actionable recommendations and validating the feasibility of the recommendations are difficult to perform conventionally.

It is with respect to these and other considerations that the various aspects and embodiments of the present disclosure are presented.

SUMMARY

Systems and methods are provided that are directed to escalation management and journey mining. The journeys and/or timelines of multiple customers may be used in escalation management and/or journey mining. An event of interest, pertaining to an issue or an incident, on a timeline may be used in the escalation management and/or journey mining. Escalation management is directed to addressing and resolving incidents, problems, and customer situations which could result in a high level of customer dissatisfaction or damage to a service provider's reputation, using the appropriate response and/or resources. Journey mining is directed to using patterns across customers and their journeys to determine where things in the journey went differently than what was expected.

In an implementation, a method comprises: identifying an issue in a timeline of a customer, wherein the timeline comprises a plurality of events; determining a cause of the issue; determining an impact of the issue on other customers; and performing escalation management based on the impact.

In an implementation, a method comprises: identifying an issue in a timeline of a customer, wherein the timeline comprises a plurality of events; providing the timeline and the issue to a user in a graphical user interface of a computing device; receiving notes from the user in the graphical user interface; annotating the timeline with the notes; and performing escalation management based on the issue.

In an implementation, a method comprises: providing a first timeline to a computing device, wherein the first timeline comprises a first plurality of events; providing a second timeline to the computing device, wherein the second timeline comprises a second plurality of events; comparing the first timeline with the second timeline to determine a shared incident; determining a cause of the shared incident; determining a remedial action; and outputting the remedial action.

In an implementation, a method comprises: retrieving data comprising at least one of an event from a customer timeline, information from a customer timeline, patterns from customer timelines, events from patterns of customer timelines, or issues related to patterns of customer timelines; building a journey using the retrieved data; and outputting the journey.

In an implementation, a system comprises: at least one processor; and a memory storing instructions that when executed by the at least one processor cause the at least one processor to: identify an issue in a timeline of a customer, wherein the timeline comprises a plurality of events; determine a cause of the issue; determine an impact of the issue on other customers; and perform escalation management based on the impact.

In an implementation, a system comprises: at least one processor; and a memory storing instructions that when executed by the at least one processor cause the at least one processor to: identify an issue in a timeline of a customer, wherein the timeline comprises a plurality of events; provide the timeline and the issue to a user in a graphical user interface of a computing device; receive notes from the user in the graphical user interface; annotate the timeline with the notes; and perform escalation management based on the issue.

In an implementation, a system comprises: at least one processor; and a memory storing instructions that when executed by the at least one processor cause the at least one processor to: provide a first timeline to a computing device, wherein the first timeline comprises a first plurality of events; provide a second timeline to the computing device, wherein the second timeline comprises a second plurality of events; compare the first timeline with the second timeline to determine a shared incident; determine a cause of the shared incident; determine a remedial action; and output the remedial action.

In an implementation, a system comprises: at least one processor; and a memory storing instructions that when executed by the at least one processor cause the at least one processor to: retrieve data comprising at least one of an event from a customer timeline, information from a customer timeline, patterns from customer timelines, events from patterns of customer timelines, or issues related to patterns of customer timelines; build a journey using the retrieved data; and output the journey.

In an implementation, a system comprises: an issue identification engine configured to identify an issue in a timeline of a customer, wherein the timeline comprises a plurality of events; a timeline analysis engine configured to determine a cause of the issue; an impact determination engine configured to determine an impact of the issue on other customers; and an escalation management engine configured to perform escalation management based on the impact.

In an implementation, a system comprises: an issue identification engine configured to identify an issue in a timeline of a customer, wherein the timeline comprises a plurality of events, and to provide the timeline and the issue to a user in a graphical user interface of a computing device; a note taking engine configured to receive notes from the user in the graphical user interface; a timeline analysis engine configured to annotate the timeline with the notes; and an escalation management engine configured to perform escalation management based on the issue.

In an implementation, a system comprises: a computing device configured to receive a first timeline, wherein the first timeline comprises a first plurality of events, and to receive a second timeline, wherein the second timeline comprises a second plurality of events; a timeline analysis engine configured to compare the first timeline with the second timeline to determine a shared incident, and to determine a cause of the shared incident; and an escalation management engine configured to determine a remedial action, and to output the remedial action.

In an implementation, a system comprises: a timeline analysis engine configured to retrieve data comprising at least one of an event from a customer timeline, information from a customer timeline, patterns from customer timelines, events from patterns of customer timelines, or issues related to patterns of customer timelines; and a journey building engine configured to build a journey using the retrieved data, and to output the journey.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 6 is an operational flow of another implementation of a method for escalation management;

FIG. 7 is an operational flow of an implementation of a method for journey mining;

DETAILED DESCRIPTION

Figure 1:
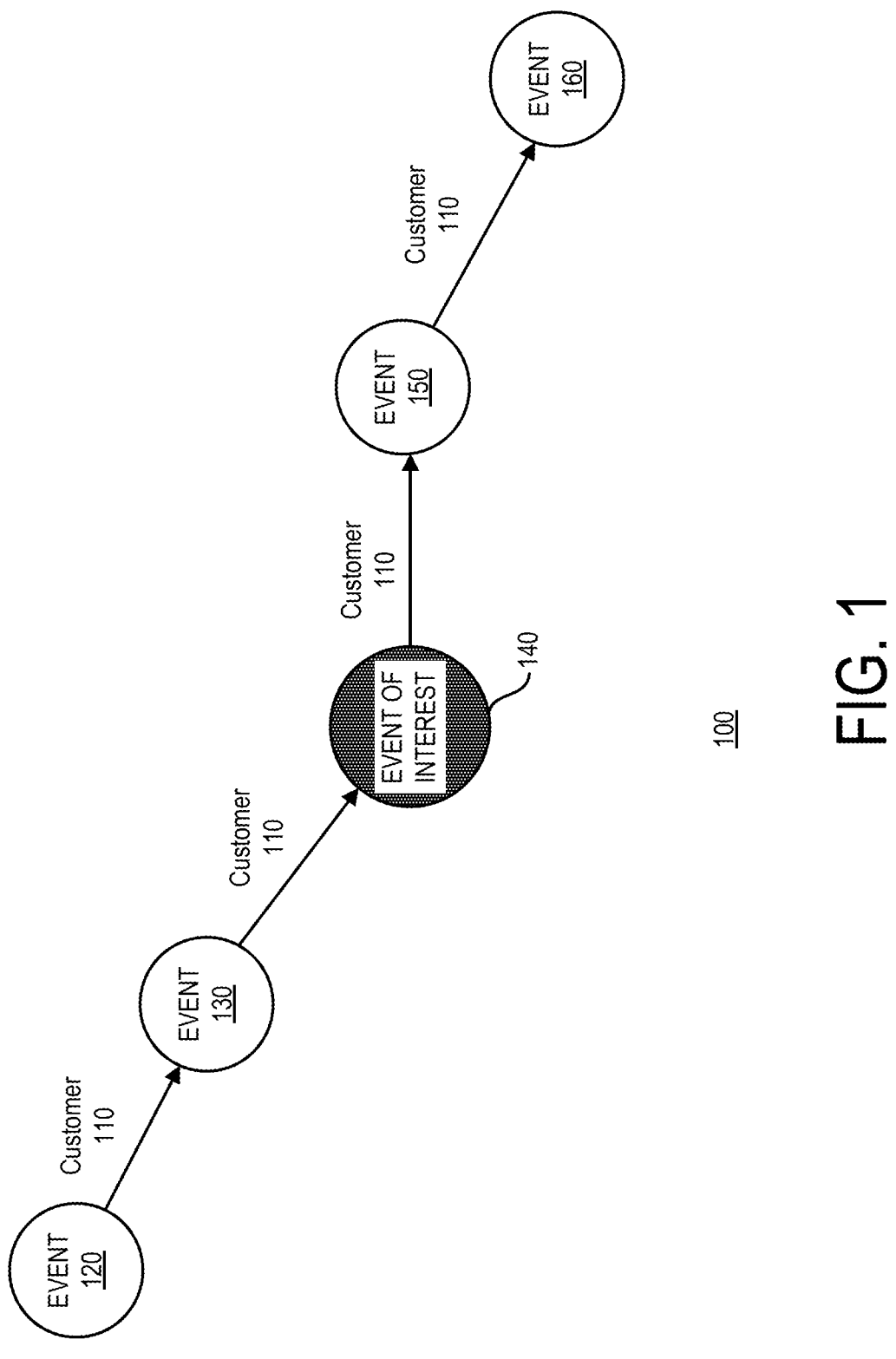
FIG. 1 illustrates an example visual representation of events in a journey in accordance with the present disclosure.

The system will now be described more fully hereinafter with reference to the included drawings, which are intended to be read in conjunction with this detailed description, the summary, and any preferred and/or particular embodiments specifically discussed or otherwise disclosed. This system may, however, be embodied in many different forms and should not be construed as limited to the embodiments set forth herein. Instead, these embodiments are provided by way of illustration only and so that this disclosure will be thorough, complete and will fully convey the full scope of the invention to those skilled in the art.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Further disclosed herein are components that can be used to perform the disclosed systems and methods. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all system and method. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the systems and methods described herein may take the form of an entirely hardware embodiment, an entirely software embodiment, or an embodiment combining software and hardware aspects. Furthermore, the systems and methods may take the form of a computer program product on a computer-readable storage medium having computer-readable program instructions (e.g., computer software) embodied in the storage medium (see also FIG. 14 herein). In an aspect, the systems and methods may take the form of hardware configured to perform specific steps (e.g., microcontrollers). More particularly, the present systems and methods may take the form of web-implemented computer software. Centrally located servers, remote located servers, or cloud services may implement embodiments of the present systems and methods. Any suitable computer-readable storage medium may be utilized including hard disks, CD-ROMs, optical storage devices, or magnetic storage devices.

Embodiments of the systems and methods are described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, computers and components found in cloud services, or other programmable data processing apparatus to produce a machine, such that the instructions which execute on the computer or other programmable data processing apparatus create a means for implementing the functions specified in the flowchart block or blocks. In an aspect, the computer program instructions may be loaded on a special purpose computer or server to carry out the functions and methods described below.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The systems and methods discussed in further detail herein are described as comprised of units. One skilled in the art will appreciate that the units are a functional description and that software, hardware, or a combination of software and hardware may perform respective functions. In one exemplary aspect, the units can comprise a computer. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

In an aspect, the present systems and methods can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, cloud services, mobile devices (e.g., smart phones, tablets, and the like) and multiprocessor systems. Additional examples comprise set top boxes, programmable consumer electronics, network PCs, minicomputers, mainframe computers, enterprise servers, distributed computing environments that comprise any of the above systems or devices, and the like.

The processing of the disclosed systems and methods can be performed by software components. The disclosed systems and methods can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

In context to the embodiments of the present invention an "event" is an action occurring at a specific point of time, such as an email being sent. An "exclusion event" is a period of time relative to other events when the event excluded must not occur, such as an email not opened for a specific duration. An "event type" defines an event category and attributes expected for the event. A "label" is a type of categorical data field. A "label name" is the name of the Label. A "Value" defines a numeric field in the event. A "value name" is the name of the value. A "unit" defines the unit of the Value, such as a percentage. An "event data field" describes a label, value, and/or unit associated with an event. "Event taxonomy" describes organizing Events by category and into hierarchy. An "actor" is a person, place, or thing participant in an Event. An "actor state" is a mapping and transformation of event data field to an actor as a function of time. An "actor role" defines the role of an actor for a certain event. An "actor type" defines an Actor category and the actor states expected for the actor. A "trend" describes how an event, event data field or actor states change over time. A "dropout" is the difference between the number of actors who entered the event and the number of same Actors who entered any of the consecutive events. A "connection" is a link between two events specifying their shared actor(s) and distance in time. An "event of interest" is an event with metric that a user desires to analyze. A "story" is a pattern representing a set of events connected by common actors and their relationship in time. A "journey" is a story for a single type of actor such as a customer. A "driver" is an event that positively or negatively influences a particular customer journey. "Driver intensity" is a degree of positive or negative influence on the metric per occurrence, independent of number of occurrences. "Driver impact" defines driver intensity multiplied by the number of occurrences. A "path" is a selection of a suite of events in a story or in a journey. A "trigger" is a selected path to be monitored at the individual level and in real-time to detect comparable behavior and initiate action. A "metric" provides measurements which underline calculations of KPI(s), in turn comprised of data drawn from event data fields and actor states within a story. A "story query" is a request in specialist language which specifies metrics and story to gather from the platform data set. A "result" is the metric value return from a story query or story execution. "Filtering/grouping" defines grouping and filtering at any event or actor level filter or group all story/journey/path.

FIG. 1 illustrates an example visual representation of events in a journey 100 in accordance with the present disclosure. A customer 110 proceeds along a series of events 120, 130, 140, 150, 160 along the journey 100. An event, such as the event 140, may be an event of interest to a user such as an analyst or an administrator. As described further herein, the events in a journey may be used to create a timeline, and/or may be comprised within a timeline. Moreover, the event 140 of interest may be used in escalation management and/or journey mining.

Each customer may proceed in their own respective journey which comprises one or more events. None, some, or all of the events in each customer's journey may be the same as the events in another customer's journey. The journeys and/or timelines of multiple customers may be used in escalation management and/or journey mining, as described further herein.

The events representation is an aggregation of multiple independent and individual events traced by each customer. The arrows of FIG. 1 represent the customers that link two events and their relationship in time. The event of interest is the anchor from which and to the story is built.

The journey 100 can take the form of a graph visualization in which the nodes of the graph represent events (e.g., the events 120, 130, 140, 150, 160), and edges represent one or more customers (e.g., the customer 110) in each event as well as the events' relationship in time (e.g., event 130 follows event 120 within 30 minutes). A journey may comprise events and customers that lays out a literal, "human-readable," story that occurred in real life over time. Stories may contain branches representing alternative journeys which converge upon, or diverge from, each other. An "event" is a discrete data point analogous to a row in a database. In certain embodiments, every event is required to have a timestamp, a specified type (e.g., a "login" or "purchase"), and at least one customer. Although events can be used to represent recorded customer actions, they can also be used to represent changes to static data like updating or creating an address record or assigning demographic or segmentation data. In certain embodiments, events need not be associated with a customer. For instance, changing a product price or placing a procurement order could also be events. In certain embodiments, events do not contain direct references to other events, but instead can share common actors which indirectly link them together. Customer are people, individuals, subjects, entities, etc. that participate in an event. For example, for an event of type "purchase," customers may include a customer, a store, an employee, and multiple product customers. Customers can be used by the system in a manner similar to how foreign keys are used in a relational database. In certain embodiments, the customers are used as "keys" in conjunction with timestamps to denote relationships between events.

In certain embodiments, nodes of the graph represent patterns to filter events. That is, nodes in the graph do not represent individual events (i.e., data points) per se. Nodes and edges represent patterns which are used together to find matching occurrences in a dataset and enable aggregation of similar patterns of events and customers.

In certain embodiments, each individual node in the graph specifies a respective filter for events in the data pool. These filters include an event type and optionally include bounds on the timestamp and constraints upon the parameters of the event. For instance, a node might represent a filter which finds purchase events paid for by credit card in May 2014 with a value of over $22.

Similarly, in certain embodiments, edges in a graph specify the relationships between nodes—specifically, shared customers and a relationship in time between two event patterns (nodes). This is analogous to a "join-on" clause in a SQL statement where two sets of data points are joined using common foreign keys.

There are a variety of types of relationships that two events can have in time, for example: event A is before or after event B; event A is within a certain amount of time before and/or after event B; event A is the most recent event before event B, or A most closely follows event B; and event A is within n events of event B.

Further details disclosing functions/operations of exemplary systems are provided below. It is noted that the descriptions provide specific implementations of systems that may be modified by one of ordinary skill in the art to provide similar functionality without departing from the spirit and scope of the systems disclosed herein.

Figure 2:
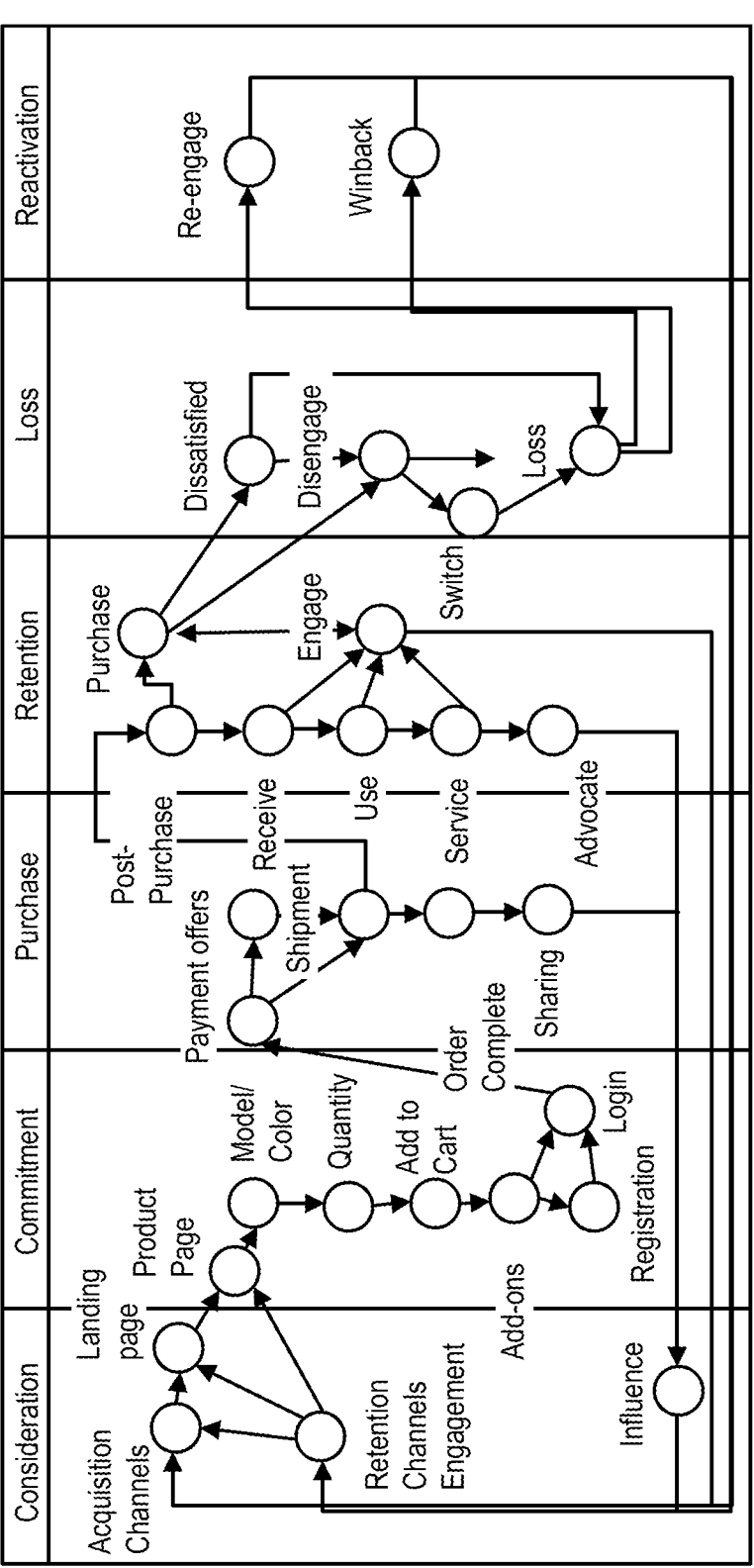
FIG. 2 illustrates an example visual representation of a customer journey across in accordance with the present disclosure.

FIG. 2 illustrates an example visual representation of a customer journey 200 across in accordance with the present disclosure. The customer journey 200 shown in FIG. 2 is an example of a customer journey across an exemplary customer life cycle. In certain embodiments, the system creates a taxonomy and hierarchy that categorize and group the events, metrics and KPIs. Each group represents a step in the customer life cycle. An event might be part of multiple taxonomies and hierarchies. For instance, the event "add to cart" can be in the following categories: "Conversion", "Web", "Purchasing" and into different hierarchy such as "Life Cycle", "Channel" or "Sale process." This approach allows for the visualization and analysis of the customer journeys in different facets-from the point of view of "Life Cycle," "Channel" or "Sale Process."

Figure 3:
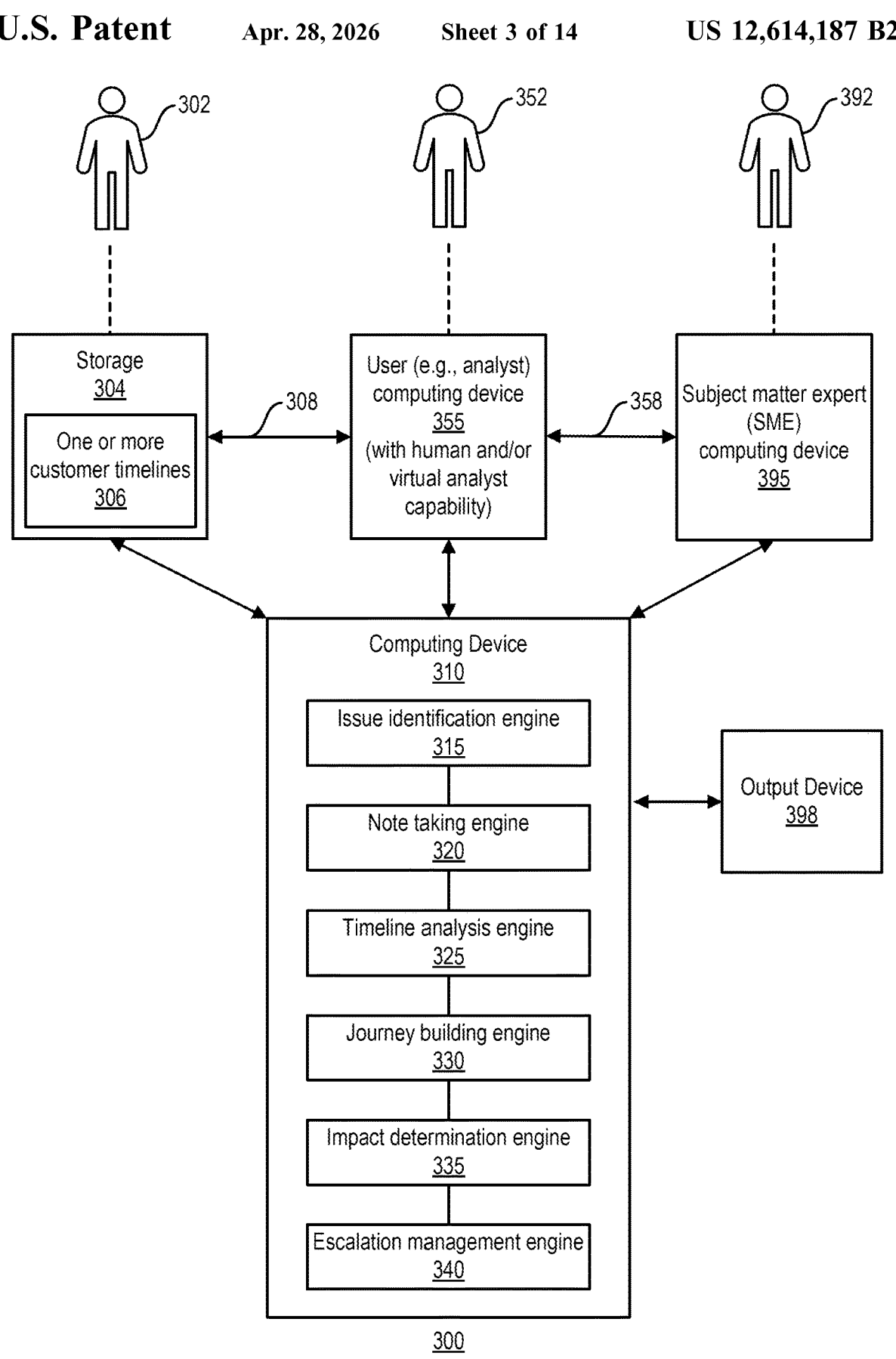
FIG. 3 is an illustration of an exemplary environment for escalation management and journey mining.

FIG. 3 is an illustration of an exemplary environment 300 for escalation management and journey mining. Escalation management is directed to addressing and resolving incidents, problems, and customer situations which could result in a high level of customer dissatisfaction or damage to a service provider's reputation, using the appropriate response and/or resources. Journey mining is directed to using patterns across customers and their journeys (and/or microjourneys) to determine where things in the journey(s) went differently than what was expected. Journey mining uses patterns in journeys and/or micro-journeys to, for example, reveal root causes, customer experience elevation opportunities, and variations from the nominal or expected path, as well as to facilitate sizing of the opportunities and variations including the total impact upon a metric or KPI.

Journey mining can handle thousands of touchpoints across many (e.g., over 50) data sources and wide-ranging timeframes. Journey mining can incorporate contextual data like natural language processing (NLP), event attributes, free text, and call recordings. Journey mining leads reliably to actionable recommendations. Journey mining can identify key behaviors at the individual customer level (e.g., escalation management) and in aggregate.

As shown in FIG. 3, the system may be described in terms of a number of components and sub-systems allowing for the operations described herein to be executed. As shown, an exemplary system may generally take events, customers, timelines, and/or journeys, and aggregate the data to a form useable by the system. The system may provide capability for escalation management and journey mining as described further herein.

The system can be employed in various suitable environments. For example, the system may be employed in consumer marketing, particularly following a customer's journey, including tracking customer interactions, engagement, retention, loss, and reactivation. However, the data structure and processing methods may be used in any industrial application where it is desirable to collect data and use it for modeling and optimization. Such applications may include, but are in no way limited to, the healthcare, manufacturing, human resources, education, hospitality, bioengineering, and social services industries.

In exemplary embodiments, timestamps associated with data or metrics such as events, customers, stories, and journeys may be collected and stored. In certain embodiments, all entries may be defined by a corresponding timestamp to allow data to be processed, analyzed, and visualized as it relates in time to other timestamps and associated data. Because each entry of the data structure can be defined by a timestamp and as all data related to the timestamp can be maintained in a timestamp format, the disclosure provides for a system, which in certain embodiments, collects data across all available data channels and preserves the integrity of all data associated with a customer.

In another implementation of an exemplary system, disparate (and related) sources of data may be automatically gathered through batch or streaming inputs to a database associated with the system. The system and database may be stored in either a local server or in a remote configuration, effecting a "cloud" based system, or any suitable combination therebetween. That is, certain embodiments are not limited to a specific storage solution or environment.

Example sources of raw or pre-processed information, which can be received by the system, include: email data; social media data (e.g., feeds from Facebook, LinkedIn, Twitter, etc.); promotional material (e.g., electronic coupons); call center data; customer relationship management (CRM) data; mobile marketing data; operational data (e.g., revenue, sales reports, etc.); and point-of-sale data (e.g., forms of payment, customer identity, etc.). However, in certain embodiments the system is not intended to be limited to a specific type of data. Instead, the system can take data used and tracked by companies in disparate and/or related systems and aggregate and/or store this data in a format that allows efficient retrieval, analysis, and representation by the system. As further described herein, data may be related through events, connections, customers, and stories. For example, the system may relate data by creating a timestamp and type for each event and associate it with one or more customers.

As referenced above, an event is an action or observation occurring at a point in time related to at least one customer, and an event data point may consist of at least a timestamp, an event type, and at least one customer. An event data point may also include other attributes such as categorical, numeric, geographic, and unstructured data. Events may share customers. Connections relate two events to each other by specifying shared customers and relative position in time. A story is a pattern representing two or more events related via shared connections. The system may present a story visually through a graph in which the nodes of the graph generally represent events and the edges generally represent connections. Journeys, which comprise one or more stories related to particular types of customers, can be graphically presented by the system in a form that allow an intuitive understanding of what events, event attributes, and event sequences most influence customers' outcomes so that future interactions can be optimized. The system may also graphically represent future actions to optimize performance.

A customer 302 performs events along a journey (e.g., the events 120, 130, 140, 150, 160 along the journey 100). The events of the journey may be stored in storage 304. Moreover, one or more timelines, such as one or more customer timelines 306) may be stored in the storage 304.

An user 352 (who may be e.g., an analyst, a representative, employee, associate, etc. of a company) may use a user computing device 355 to access the storage 304 (including the customer timeline(s) 306) through a network 308. In some embodiments, the user 352 may be a virtual analyst and not a human analyst.

A computing device 310 may be in communication with the user computing device 355 and the storage 304 to provide various functions, operations, capability, and/or data to the user computing device 355 (and thus the user 352). The computing device 310 may be implemented in, or embodied in, a desktop analysis product, in some implementations. Depending on the implementation, an output device 398 may be in communication with the computing device 310, in either a wired connection or a wireless connection.

In some implementations, a subject matter expert (SME) 392 (who is either human or virtual) may use an SME computing device 395 to communicate with the user computing device 355 and the computing device 310, e.g., over a network 358.

The networks 308, 358 may each be a variety of network types including the public switched telephone network (PSTN), a cellular telephone network, and a packet switched network (e.g., the Internet). The networks 308 and 358 may be the same network or may be different networks depending on the implementation. Although only one user computing device 355, one computing device 310, one SME computing device 395, one storage 304, and one output device 398 are shown in FIG. 3, there is no limit to the number of computing devices 310, 355, 395, storages 304, and output devices 398 that may be supported.

Figure 14:
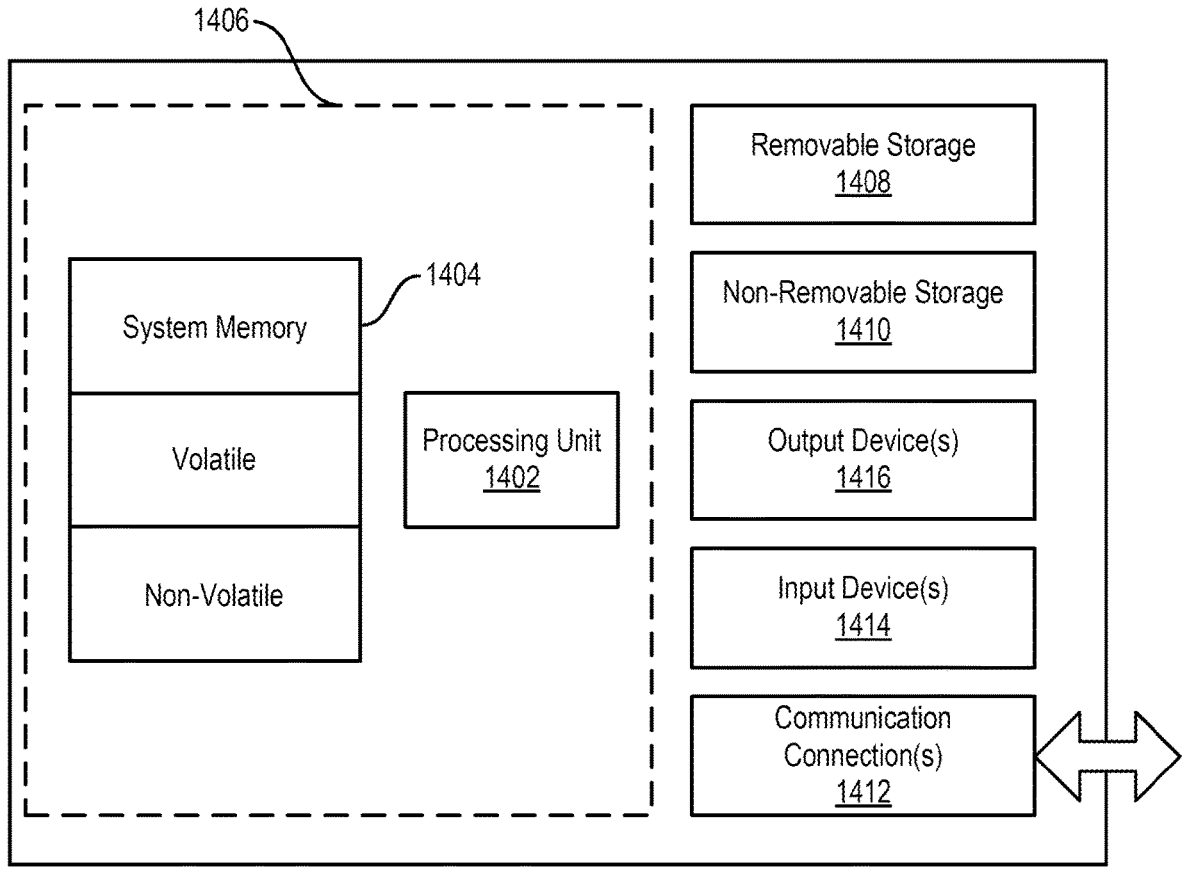
FIG. 14 shows an exemplary computing environment in which example embodiments and aspects may be implemented.

The user computing device 355, the SME computing device 395, the computing device 310, and the output device 398 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 14 as the computing device 1400.

In some implementations, the computing device 310 comprises an issue identification engine 315, a note taking engine 320, a timeline analysis engine 325, a journey building engine 330, an impact determination engine 335, and an escalation management engine 340. As described further herein, the computing device 310 and its various engines 315, 320, 325, 330, 335, 340 assist the user 352 in providing better service and information to the customer 302, through escalation management and journey mining.

The issue identification engine 315 is configured to analyze one or more timelines of one or more customers and identify one or more issues therein. An issue may be any type of event that is predetermined depending on the implementation. Examples of issues may include the customer contacting a help center, the customer discontinuing a purchase, the customer emptying shopping cart, the customer stopping the journey for a predetermined amount of time, the customer logging off or otherwise exiting an online experience or journey.

In some implementations, a human user (as opposed to an automated system) may identify an issue based on their business context applied to the timeline(s) they are observing.

In some implementations, the human user may be augmented with artificial intelligence (AI). For example, based on prior human inputs, a machine learning system will learn the statistical characteristics of incidents previously denoted as issues and use the knowledge of these characteristics to identify possible issues relevant to the investigation at hand. The issue identification engine 315 may be fully automated or may provide supplemental information to the human user to accelerate their own process of issue identification. Human interactions with the output of the issue identification engine 315 may be further incorporated into the machine learning model to reinforce accurate identification and suppress future inaccuracies. Statistical characteristics may rely on features of the time series data such as: the occurrence of certain typically-problematic events; specific qualities of otherwise-benign events such as their attributes, timestamps, or other metadata; or the relationship in time between two or more events. Note that any of the above are generally eligible to be issues, even in the human-analyst context. Issues are not just constrained to the simple occurrence of certain event types. The model may further incorporate attributes of the customer such as demographics.

In some implementations, the issue identification engine 315 is configured to retrieve the event history for a customer and render it in the timeline visualization for the user, and also providing access to the metadata underlying individual events via user interactions.

The issue identification engine 315 may also be configured to provide filtering of the events shown in the timelines. Filtering can be either inclusive or exclusive and may be a set of specific event types and/or certain metadata about those events (for instance, only show events from the website, or do not show events related to internal processes).

The note taking engine 320 is configured to allow a user 352 to enter notes about a timeline, or an issue and/or an event therein, into an interface displayed on the user computing device 355, as described further herein. In some implementations, all notes are pinned to a timeline visualization, either to an event on the timeline or to a point on the timeline in between events. Notes may be used, for example, to flag observations such as failures or successes, denote root causes and incidents, or for collaboration by addressing or assigning tasks or questions to other users.

The timeline analysis engine 325 is configured to analyze timelines, such as by comparing timelines and analyzing timelines for patterns related to events in one or more journeys and identifying these patterns or events and/or issues, including root cause(s), related to the identified patterns, as described further herein. In some implementations, a human user (as opposed to an automated system) may identify one or more root causes based on their business context applied to the timeline(s) they are observing. In the case of multiple timelines, commonalities may be determined across the timelines, by the timeline analysis engine 325, to help narrow the search space for the human users when looking for potential root causes.

The timeline analysis engine 325 may be fully automated or may provide supplemental information to the human user to accelerate their own process of root cause identification.

The journey building engine 330 is configured to allow a user 352 to create (build) a new journey using events and/or information from one or more customer timelines and/or patterns or events and/or issues related to the identified patterns, as described further herein. More particularly, with the journey building engine 330, the user 352 has the ability to place events in an order, specify the "connection" properties between events (within a certain amount of time of each other, sharing certain event properties, etc.), and filter the events on their attributes/metadata. Moreover, multiple journeys can be created as an affordance to, for example: highlight multiple journey patterns in the displayed timelines; import timelines from different, but related, journeys; import timelines of customers who participated in multiple journeys.

The journey building engine 330 can be used to fetch additional timelines of customers who participated in the journey and add them to the user interface for manual or automated analysis. The journey building engine 330 can highlight in the timelines the occurrences of the journey.

In addition to using events in the visible timelines in the journey, the user may manually add other events known to the system though not necessarily present in the currently-viewed timelines.

The impact determination engine 335 is configured to determine the impact that the identified patterns have (or may have) on other customers' journeys or timelines. This allows an entity associated with the journey or timeline(s) being analyzed to determine how wide-scale the issue(s) may be among their customer base.

In some implementations, the impact determination engine 335 can get and provide the total count of customers who have participated in the journey or the total number of times the journey has occurred. The impact determination engine 335 can provide "funnel"-type statistics at each node in the journey providing the number and percentage of customers who moved forward or completed the journey as well as the number of customers who dropped out at each event along the way.

The impact determination engine 335 allows for the creation of custom calculations and charts with the ability to perform aggregations and arithmetic operations to any of the attributes in the events in the journey. The impact determination engine 335 also allows for the creation of charts analyzing the attributes of customers who participated in the journey (e.g. the number of participants by age range, the average NPS score of customers) as well as how the mix of those attributes changes as customers progress through the journey.

The above functions provide the ability to quantify the impact of the journey on cost, revenue, customer satisfaction, or any other metric. The effect is to take a pattern identified from a plurality of timelines, get the total count of the number of customers who have had that same behavior pattern, and quantify how the occurrence of that pattern corresponds with a change in any metric. This functionality can also be used to quantify potential "silent detractors" or those customers who may have had a problematic behavior/event-pattern but never had the final resulting incident that enabled them to be flagged/counted.

The escalation management engine 340 is configured to determine and/or implement appropriate action to remediate, plan for, and/or prevent the issue with respect to one or more individual customers and/or some or all of the entity's customer base. The escalation management engine 340 has the ability to automatically create reports and/or deliverables from the work product produced by the other engines, most notably the note taking engine 320. Reports can then be distributed within the platform to the intended audience. Consumers of the report may also "drill into" the report to see the underlying customer timelines and analysis.

In some implementations, the impact determination engine 335 and/or the escalation management engine 340 identifies opportunities that can be used to guide or alter the interaction towards a better outcome for the mutual benefit of both the customer 302 (i.e., the end customer) and the entity (e.g., the organization) of the user 352.

Various templates can be used for the escalation management deliverables. The templates may be created to address the specific needs of different use cases and scenarios. Different aspects of analysis may be included in the deliverable, such as notes, measurements, journeys, charts, customer lists, and data in free-form summary fields.

The analysis and/or the deliverable (e.g., the outputted timeline or data from the computing device 310) may be outputted or displayed to one or more users or user computing devices, such as the analyst computing device 355 and/or the output device 398. Via the graphical interface, a user 352 may ask clarifying questions or request additional analysis. A user 352 may click into the deliverable to view the detailed underlying data story within the analysis.

The SME computing device 395 may be used by the SME 392 to communicate with the user 352 (via the user computing device 355), in various implementations as described further herein.

It is contemplated that the system may be provided as a software as a service (SaaS) model through a cloud-based database structure. However, other embodiments may include localized whole or partial data storage. Additionally, the precise location of processors and computers implementing the system may vary by embodiments. In some embodiments, the entire system may reside remote to the end user (e.g., the user 352 or other user or administrator associated with the entity), except for the client (user) service device where a graphical interface is provided—e.g., mobile phone, computer, etc., while in other embodiments, the entire system may reside local to the end user. As such, the precise location of the components of the system may not necessarily be critical to an understanding of the application of the functions of the disclosed inventive system.

In some embodiments, the system 300 may receive data from one or more sources, and store the data in the storage 304 or other storage associated with one or more of the computing devices 310, 355, 395. This may be done through a batch transfer of past events or real-time as provided herein. A data manager may take the data, which can be in a variety of disparate formats, and prepare the data to be used by the system as described herein. For example, the data may be formatted to interrelate details such as the time of an event, the type of an event, the subject of an event, and/or a customer performing an event. In at least one embodiment, the data is formatted to interrelate with other data at least through a timestamp and identification of the event to which the data relates. The data may then be stored in the storage 304 or other data memory for efficient retrieval by one or more components of the system 300.

Once the data is formatted or translated into a useable format (or stored according to the system requirements), it may then be used by the system to provide to a user such as the user 352 via the user computing device 355. To do so, a client application may be provided on a third party client device (e.g., the user computing device 355), such as a personal computer or mobile device (e.g., phone or tablet). The client device may further provide a graphical interface through which a user may interact with the system. In some embodiments, this interaction may involve a user selecting specific pre-set queries provided by the system or building additional queries based on options provided by the system. For example, through a client application on the user computing device 355 (and/or the SME computing device 395), a user (such as the user 352 or the SME 392) may request to see a set of events within a specific time period that affect product or service sales over the same time period, for example. The client application can then request that the system perform the requested query and deliver the requested information, which can be provided in an intuitive graphical interface as provided herein. This may be done by sending the query directly to the computing device 310. The computing device 310, in turn, may build and run the query (performing a set of logical operations on the available data) to return usable results to the client application. In addition, the client application may also request and retrieve information directly from the storage 304 and/or other data memory, which can be likewise be provided to the user through the graphical interface.

As such, the system is capable of providing an easy-to-understand graphical interpretation of the data to relate events, customers, and stories to one another, thus providing feedback instrumental to users of the system.

Figure 4:
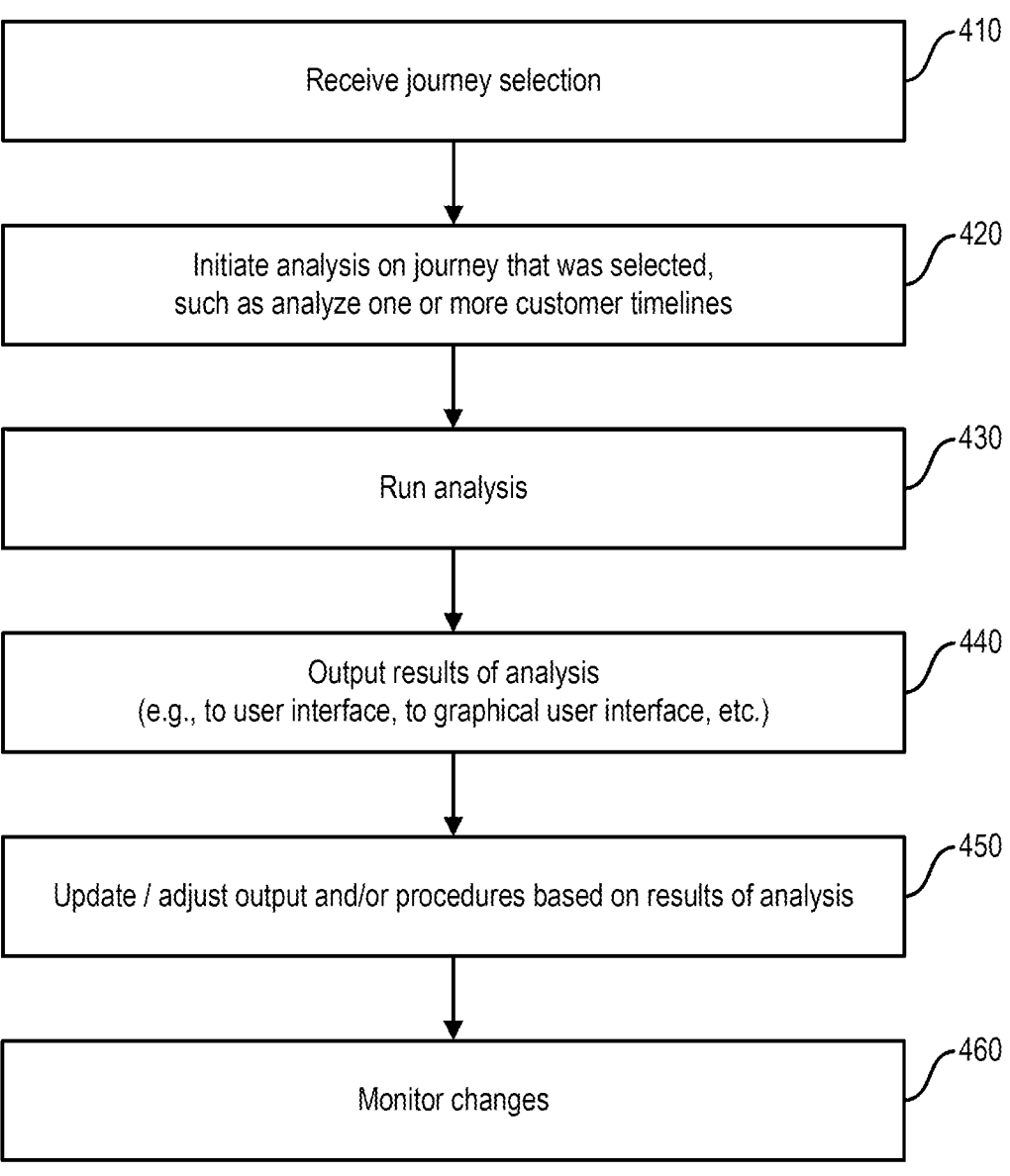
FIG. 4 is an operational flow diagram illustrating a high level overview of example operations performable by the system in accordance with the present disclosure.

FIG. 4 is an operational flow diagram illustrating a high level overview of example operations 400 performable by the system (e.g., the system 300) in accordance with the present disclosure.

At 410, a system, such as that described with respect to FIG. 3 and/or FIG. 14, receives a journey selection. Depending on the implementation, the user (e.g., an analyst) may select a previously generated journey from storage, such as the storage 304, or may instruct the system to build a journey (e.g., using the journey building engine) as described herein.

At 420, an analysis is initiated (e.g., selected) of the journey selected in 410, and the analysis is run at 430. In some implementations, the user (e.g., an analyst) may click on a start button on the graphical user interface to initiate the analysis at 420. At 430, the analysis is run, using the customer's data (e.g., the journey data from their customer's journeys) alone or in conjunction with third party data. Such data may be stored and/or retrieved from storage (e.g., a data repository such as the storage 304) associated with the system described with respect to FIG. 3 and/or FIG. 14, for example, depending on the implementation. This operation may be performed by the issue identification engine 315 and/or the timeline analysis engine 325 depending on the implementation.

Features that may be analyzed include occurrence (whether or not the event occurred at least once), frequency (the number of times an event occurred), time interval (the amount of time between this event and the milestone event), root time interval (the amount of time between the milestone event and the target event), time cycle (cyclicality with a specified period), etc. The journey may be analyzed to identify or otherwise determine an event that is, or may potentially be or become, an issue. In some implementations, individual customer journeys and/or timelines (histories) are analyzed for escalation management and opportunity investigation. The analysis may include measuring and/or computing various metrics, comparing actions, metrics, and/or results, and annotating one or more of the customer timelines, depending on the implementation.

In some implementations, the analysis at 430 looks at the customer histories and their patterns and behaviors, as well as conversation flows and analysis of conversation, that led to a particular issue, event, or problem.

At 440, an output based on the analysis is generated and provided to the user (e.g., analyst), for example. The system provides output, e.g., to the user (analyst), via a user interface or other display or output device, such as the output device 398. The output may be an event, a timeline, an issue, a journey, etc., depending on the implementation. The risk or opportunity to an entity (e.g., a business that a customer engaged with) may be determined by building journeys directly from the timelines, and may be provided as output at 440. A list of customers having similar issues, events, or situations may be generated and outputted at 440 for subsequent use by a user such as an analyst or entity. The output may be provided in a user interface, such as a graphical interface that a user can interact with (e.g., by reviewing, annotating, etc.).

At 450, the analyst or other user may use the results of the analysis, and then update and/or adjust the output (e.g., by annotating the output, etc.) and/or procedures (e.g., directed to escalation procedures, risks, opportunities, etc.). This operation may be performed by the note taking engine 320 and/or the escalation management engine 340 depending on the implementation.

At 460, the changes (i.e., the updates and/or adjustments) may be monitored (e.g., by the user such as the analyst or the entity) to determine their effectiveness, etc. Case management workflow may be used to create and assign cases, track their progress, and generate actionable deliverables.

Figure 5:
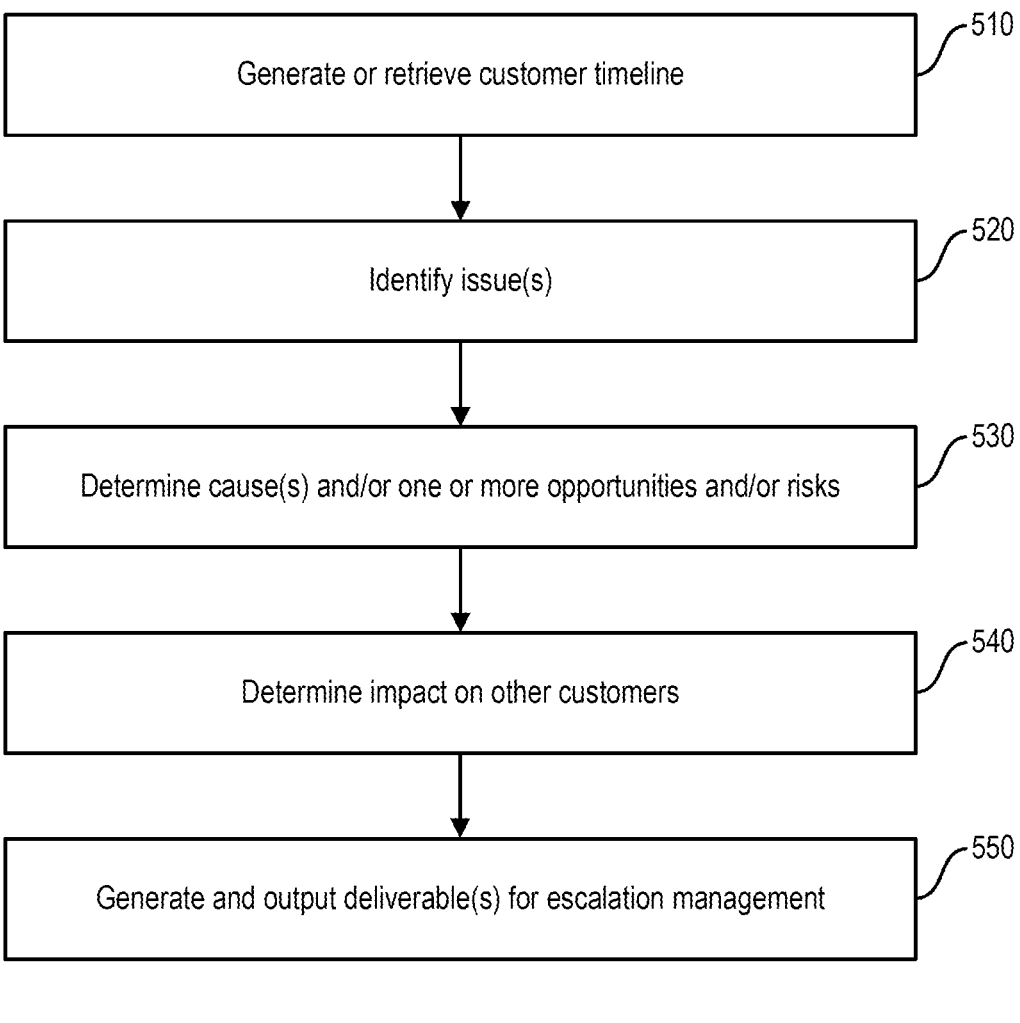
FIG. 5 is an operational flow of an implementation of a method for escalation management.

FIG. 5 is an operational flow of an implementation of a method 500 for escalation management. The method 500 may be performable by the system (e.g., the system 300) in accordance with the present disclosure.

At 510, a customer (e.g., of an entity) timeline is generated or retrieved from storage. The timeline has a series of events. The customer timeline may be one of the actor timelines 306 maintained in the storage 304, in some implementations.

At 520, the timeline is analyzed to identify one or more issues (e.g., events that indicate a deviation from what is expected, predetermined events, etc.). This operation may be performed by the issue identification engine 315 and/or the timeline analysis engine 325 depending on the implementation.

At 530, the cause(s) of the issue(s) is determined. One or more opportunities and/or risks directed to the issue(s) may be determined in some implementations. This operation may be performed by the issue identification engine 315 and/or the timeline analysis engine 325 depending on the implementation.

At 540, an impact the issue(s) may have on other customers (e.g., of the entity) is determined. This operation may be performed by the impact determination engine 335, in some implementations.

At 550, one or more deliverables for escalation management are generated and output, for example, to the analyst computing device or other output device. This operation may be performed by the escalation management engine 340, in some implementations.

FIG. 6 is an operational flow of another implementation of a method 600 for escalation management. The method 600 may be performable by the system (e.g., the system 300) in accordance with the present disclosure.

At 610, an issue with respect to an event in a customer timeline is identified, e.g., by the issue identification engine 315. A "case" pertaining to the issue is generated and sent to an analyst, such as the user 352. In some implementations, the case may be submitted to a queue and then later sent to a user at a predetermined time for example.

At 620, the case is accepted by the user, e.g., via the user computing device 355. At 630, the user reviews the case including the timeline(s) (i.e., the history represented by the data) that include the event that indicates the issue. The user may review the case in a graphical user interface displayed on the user computing device 355, and annotate the notes of the case via the graphical user interface. The note taking engine 320 may facilitate the note taking and annotation of the case.

At 640, the user may use inline collaboration to discuss observations with one or more SMEs (human subject matter experts), such as a SME 392 via the SME computing device 395. Notes of the case may be further annotated by the user 352 via a graphical user interface provided on the user computing device 355.

At 650, the user may identify root causes of the issue(s) and determine risks and/or opportunities for escalation management to increase customer satisfaction. The user may provide this information into the case notes or otherwise output this information.

At 660, the total impact of the issue may be determined, e.g., using the impact determination engine 335. In an implementation, an integrated journey builder may be used to size total impact of the issue, to determine or estimate if the issue is a big issue that affects a lot of customers.

At 670, a deliverable for escalation management is generated and distributed or otherwise implemented, e.g., by the escalation management engine 340.

FIG. 7 is an operational flow of an implementation of a method 700 for journey mining. The method 700 may be performable by the system (e.g., the system 300) in accordance with the present disclosure.

At 710, a timeline of a first customer is received or retrieved (i.e., a first timeline), e.g., from the one or more customer timelines 306 of the storage 304. At 720, a timeline of a second customer is received or retrieved (i.e., a second timeline), e.g., from the one or more customer timelines 306 of the storage 304.

At 730, the first timeline and the second timeline may be displayed together to the user, such as displayed (e.g., pinned together) on a graphical user interface that is provided on the user computing device 355.

At 740, the first timeline and the second timeline may be compared to each other to determine a shared incident (e.g., a similar event on each timeline). The first customer and the second customer may have a shared incident, such as they both call in to a call center at the same time, after the same event, at some commonality, etc. Depending on the implementation, the shared incident may occur at approximately the same date and time, or at different times and/or days. The comparison may be performed by the timeline analysis engine 325 in some implementations and/or with the user 352 and/or the user computing device 355.

At 750, it is determined what pattern(s) (e.g., common events, common portions of the two timelines, etc.) in the two timelines led to the shared incident. In this manner, it may be determined whether there are patterns that led to the two customers similar behavior (e.g., both customers calling in to a call center or whatever shared incident they have). The determination may be performed by the timeline analysis engine 325 in some implementations and/or with the user 352 and/or the user computing device 355.

At 760, remedial action directed to addressing and/or preventing the incident may be determined and outputted. The remedial action determination and outputting may be performed by the escalation management engine 340 in some implementations and/or with the user 352 and/or the user computing device 355.

At 770, in some implementations, one or more timelines of one or more additional customers may be selected and added and displayed on the graphical user interface (e.g., of the user computing device 355) and/or analyzed. In this manner, these one or more timelines may also be pinned with the first and second timelines for further analysis against a shared incident. The analysis may be performed by the timeline analysis engine 325 in some implementations and/or with the user 352 and/or the user computing device 355.

At 780, using the additional analysis of 770, additional or alternative remedial action (to that of 760) directed to addressing and/or preventing the incident may be determined and outputted. The remedial action determination and outputting may be performed by the escalation management engine 340 in some implementations and/or with the user 352 and/or the user computing device 355.

Figure 8:
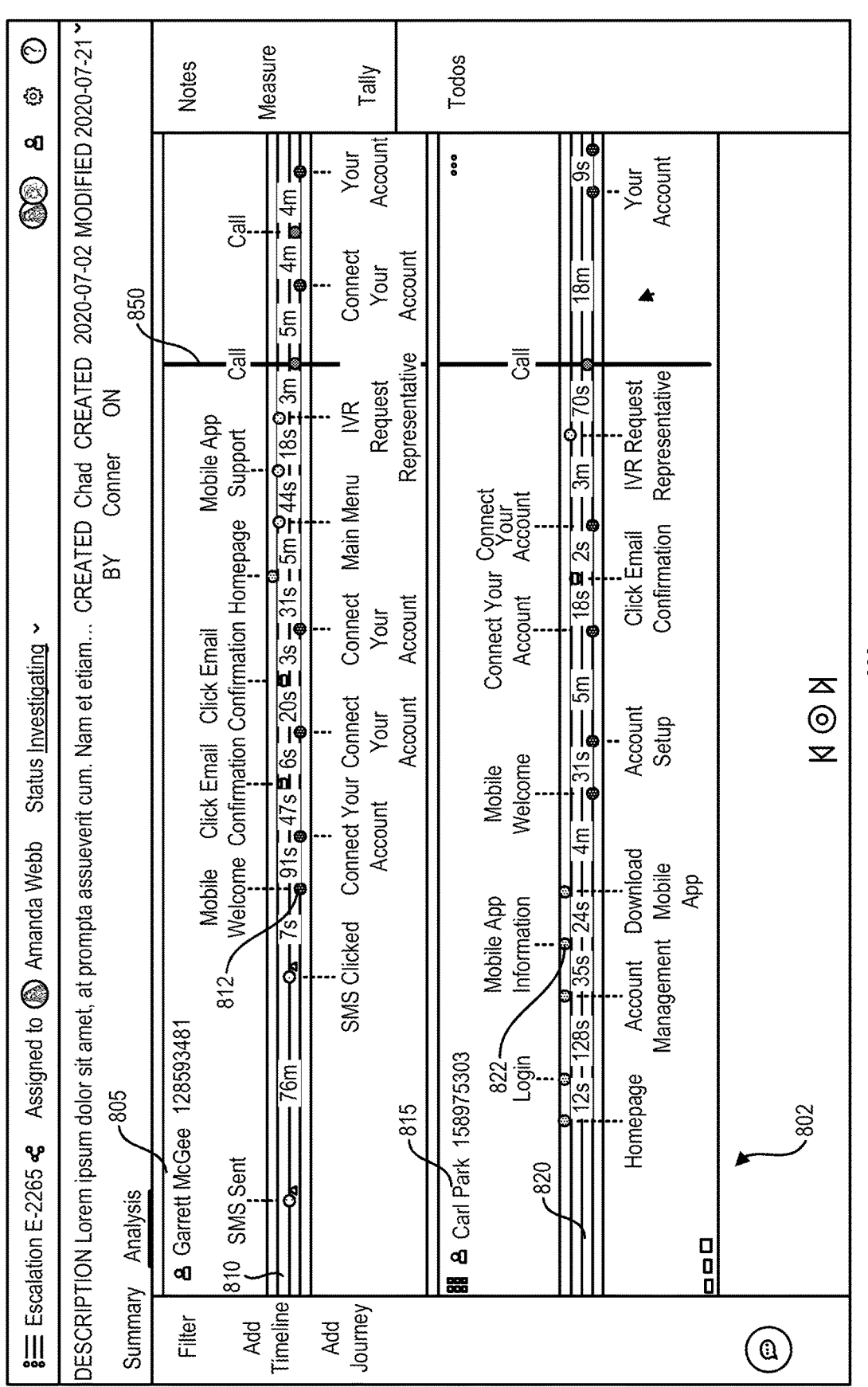
FIG. 8 illustrates an example graphical user interface in accordance with the present disclosure.

FIG. 8 illustrates an example graphical user interface 800 in accordance with the present disclosure. The graphical user interface 800 may be displayed or otherwise provided on a computing device, such as the user computing device 355, the SME computing device 395, the computing device 310, and/or the output device, for example, depending on the implementation.

In the example graphical user interface 800, a first timeline 810 of a first customer 805 is shown, along with a second timeline 820 of a second customer 815. Each timeline shows a specific customer with specific events.

These two timelines may be considered to be pinned together here. Various events are shown in each timeline, such as the mobile welcome event 812 of the first timeline 810, and the mobile app information event of the second timeline 820. There is shown a shared incident 850, which corresponds to a call on each of the first timeline 810 and the second timeline 820. Patterns and/or events of the first timeline 810 and/or the second timeline 820 may be determined and/or analyzed to reveal what action(s) might have led to the shared incident, and what remedial action (e.g., escalation management) may be taken to address the shared incident in the present and/or in the future.

The user can pin the timelines to each other at whatever respective points in time they choose, such as at a shared incident, but this is not intended to be limiting. In some implementations, the timelines are scaled in a manner that the order of events, and relative position in time, of events across timelines (among multiple timelines) will be comparable. Thus for example, if an Event 2 in a Timeline B is to the right of an Event 1 in a Timeline A, this means that Customer B had Event 2 after Customer A had Event 1 with respect to the pinned point on each timeline.

The graphical user interface 800 may provide an area 802 from which timelines and/or journeys may be created, displayed, and/or analyzed in near real-time and from disparate data sources. Information gathered by the system may be assessed and analyzed through this graphical user interface 800. Incidences of events based on the selected modelling may be provided by the system in a timeline area (part of the area 802) of the graphical user interface 800. For example, the timeline may show the distribution of a story over time. The user can focus on a specific period by selecting a specific start and end date and the area 802 can be automatically refreshed by the system based on this new period.

Figure 9:
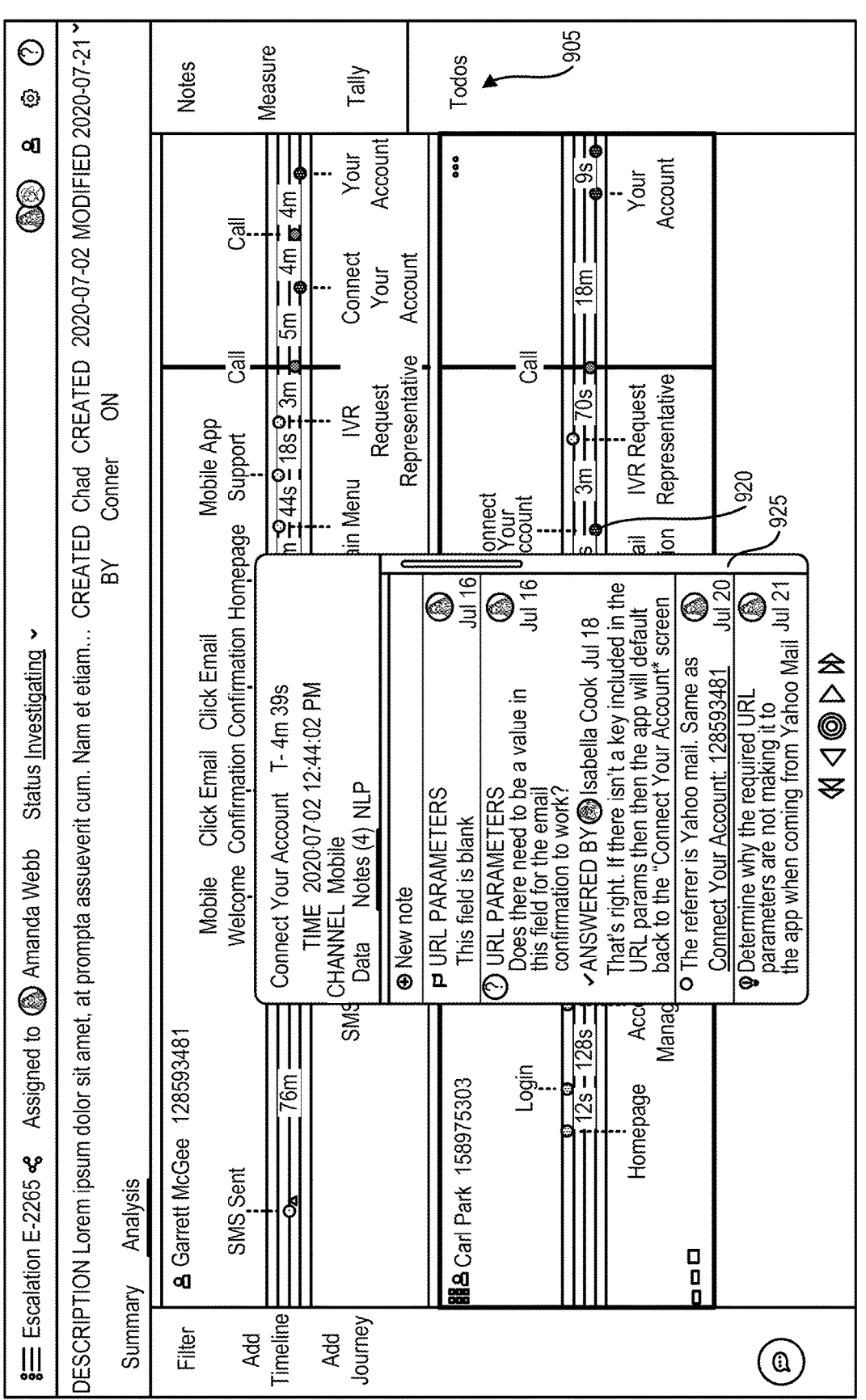
FIG. 9 illustrates an example graphical user interface in accordance with the present disclosure.

FIG. 9 illustrates an example graphical user interface 900 in accordance with the present disclosure. The interface 900 provides various tabs 905 that show underlying data around the customer accounts (e.g., type of phone, size of phone display URL, etc.). A notes section 925 is provided that corresponds to an associated event. Each event may have an associated notes section in which a user can record thoughts, notes, and/or observations associated with the timeline and/or the event, for example. Buttons allow a user to skip through the user's notes in sequence. The user looks at interesting things in the histories of the customers and takes notes about what might be interesting (e.g., may be a root cause) that led to the shared event (i.e., the shared incident).

The note taking engine 320 may be used to receive and maintain event and timeline notes in this manner.

Figure 10:
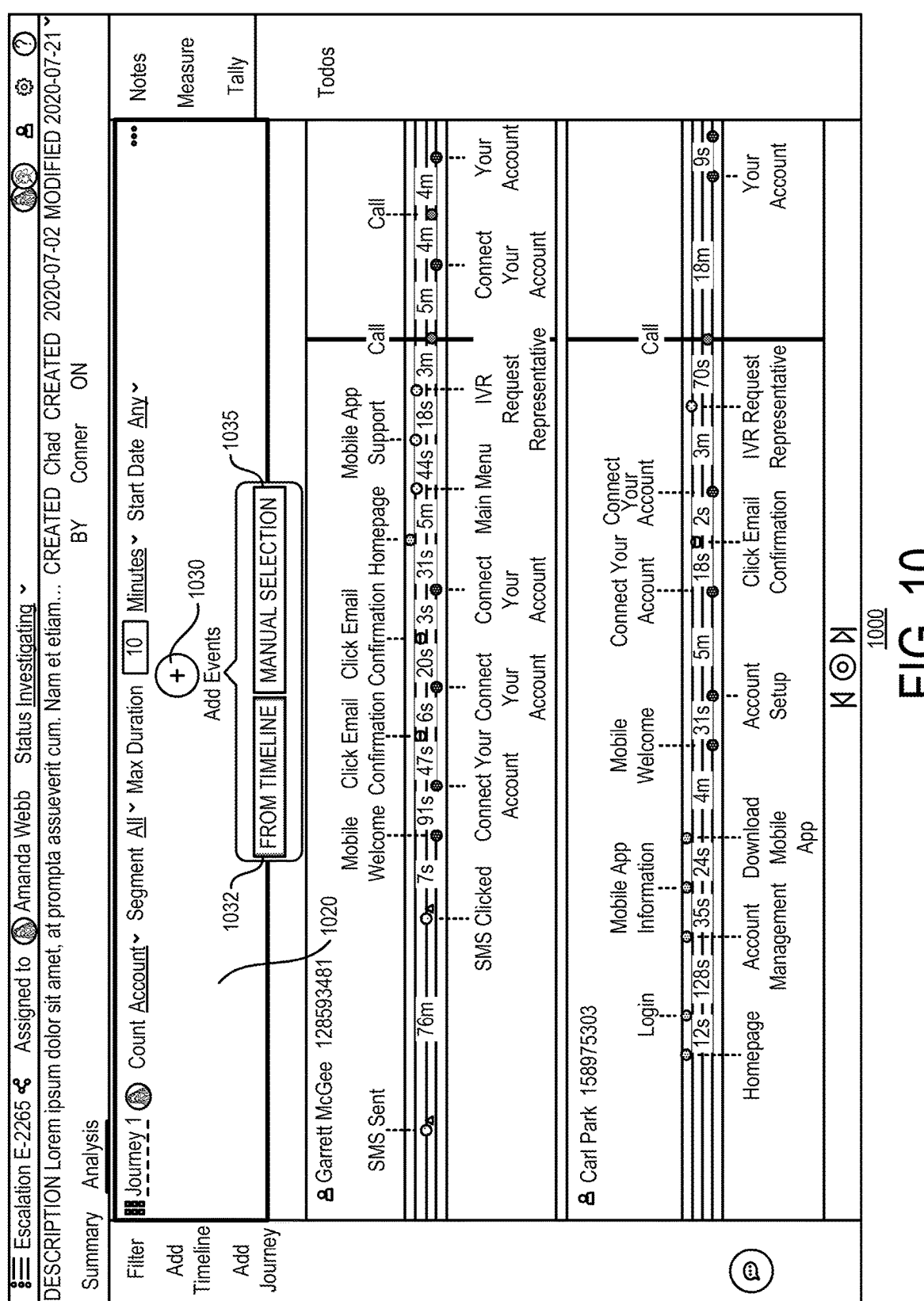
FIG. 10 illustrates an example graphical user interface in accordance with the present disclosure.

FIG. 10 illustrates an example graphical user interface 1000 in accordance with the present disclosure. An area 1020 (i.e., a journey canvas) is provided that allows a user to create or otherwise construct a timeline (or journey) using events (i.e., selected nodes). The user may select "add events" 1030 and then add an event to the timeline or journey they are creating. The new journey then be created when the user makes an "apply" selection (not shown). The user may add an event from a displayed timeline (e.g., the first timeline or the second timeline) by selecting "from timeline" 1032 or manually selecting an event (e.g., from a library in storage, or other timeline that is not displayed on the graphical user interface 1000) by selecting "manual selection" 1035. The journey building engine 330 may be used to create the timeline or journey in this manner.

By creating a new journey, using selected events from one or more journeys, a user such as an analyst may be able to determine how many people (e.g., customers) had a similar incident or issue, check the demographics of those people (e.g., customers), and perform other types of analysis and thus determine a resolution to the incident or issue that many people (e.g., customers) encountered or may encounter.

Figure 11:
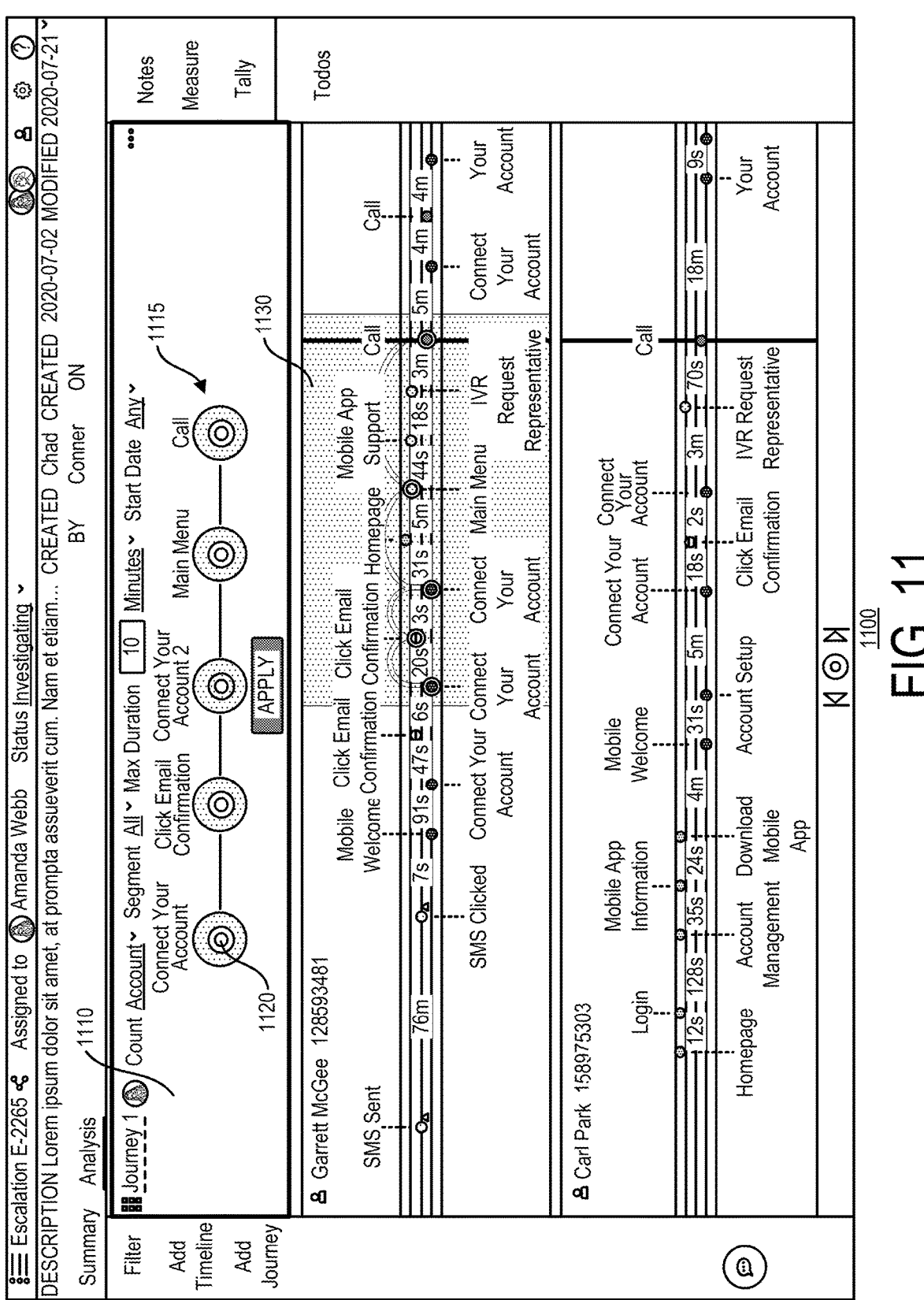
FIG. 11 illustrates an example graphical user interface in accordance with the present disclosure.

FIG. 11 illustrates an example graphical user interface 1100 in accordance with the present disclosure. In the area 1110 that is provided to allow a user to create or otherwise construct a timeline (or journey) using events, a journey 1115 that is being constructed is displayed. The journey 1115 comprises events, such as the event 1120. These events may be based on events in a customer timeline, such as one or more events from the timeline 1130.

Figure 12:
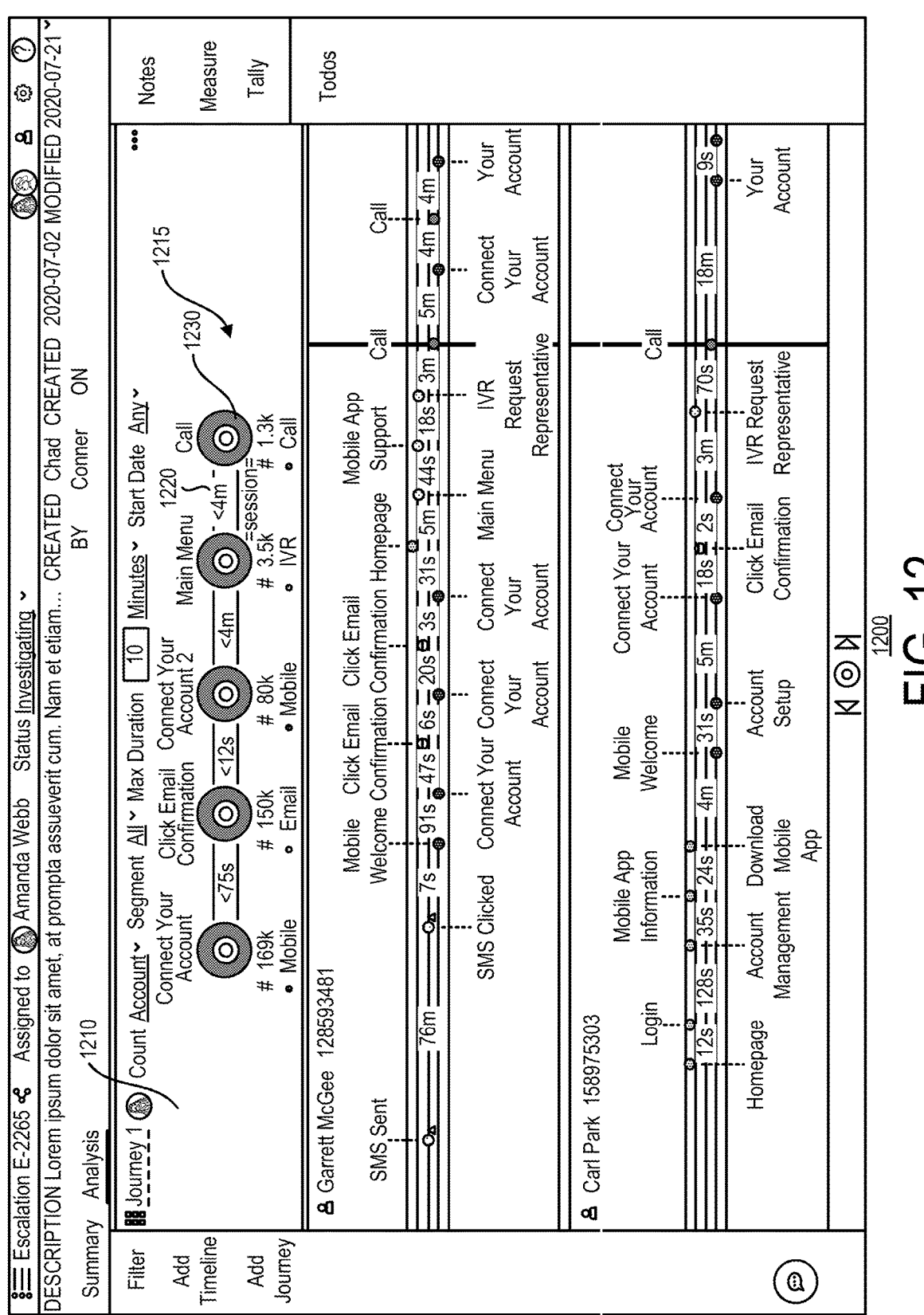
FIG. 12 illustrates an example graphical user interface in accordance with the present disclosure.

FIG. 12 illustrates an example graphical user interface 1200 in accordance with the present disclosure. In the area 1210 that is provided to allow a user to create or otherwise construct a timeline (or journey) using events, a journey 1215 that is being constructed is displayed. The journey 1215 comprises events, such as the event 1230 as well as time information (such as the time information 1220) between the events. The events and time information may be based on events in one or more customers timelines, for example.

Figure 13:
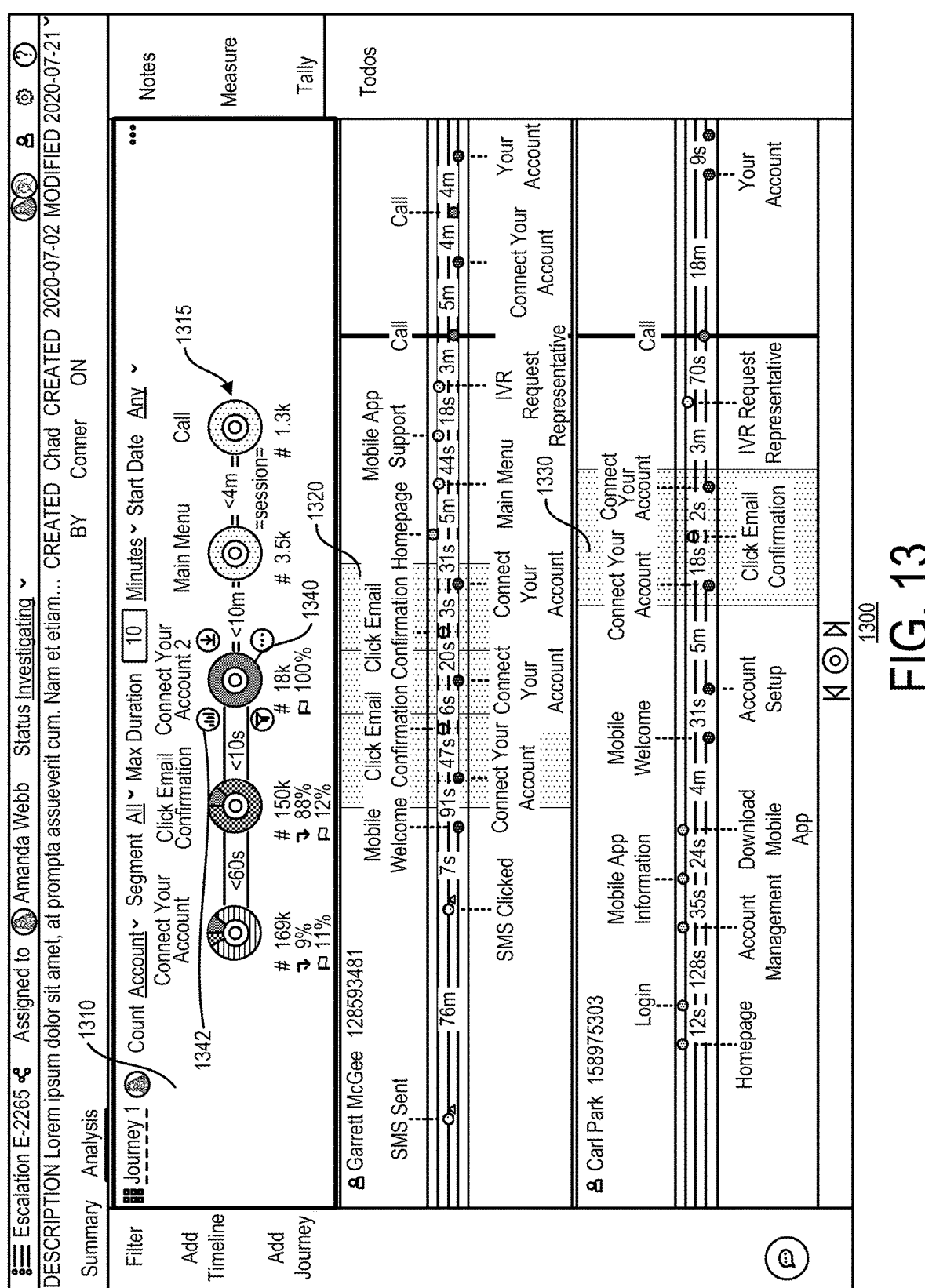
FIG. 13 illustrates an example graphical user interface in accordance with the present disclosure.

FIG. 13 illustrates an example graphical user interface 1300 in accordance with the present disclosure. In the area 1310 that is provided to allow a user to create or otherwise construct a timeline (or journey) using events, a journey 1315 that is being constructed is displayed. The journey 1315 comprises events, such as the event 1340 which shows various selectable actions 1342 pertaining to data around the event 1340. This actions 1342 may provide data generated from the various customer timelines 1320 and 1330.

FIG. 14 shows an exemplary computing environment 1400 in which example embodiments and aspects may be implemented. While certain embodiments have been described herein, the disclosure should be understood as capable of being applied to a variety of contexts and technological fields beyond those explicitly addressed.

Further, when the logical operations described herein are implemented in software, the process may execute on any type of computing architecture or platform. For example, referring to FIG. 14, an example computing device upon which embodiments of the invention may be implemented is illustrated. In particular, the system may operate using one or more computing devices, such as computing device 1400 shown in FIG. 14. FIG. 14 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 14, an exemplary system for implementing aspects described herein includes a computing device, such as computing device 1400. In its most basic configuration, computing device 1400 typically includes at least one processing unit 1402 and memory 1404. Depending on the exact configuration and type of computing device, memory 1404 may be volatile (such as random access memory (RAM)), non-volatile (such as read-only memory (ROM), flash memory, etc.), or some combination of the two. This most basic configuration is illustrated in FIG. 14 by dashed line 1406.

Computing device 1400 may have additional features/functionality. For example, computing device 1400 may include additional storage (removable and/or non-removable) including, but not limited to, magnetic or optical disks or tape. Such additional storage is illustrated in FIG. 14 by removable storage 1408 and non-removable storage 1410.

Computing device 1400 typically includes a variety of computer readable media. Computer readable media can be any available media that can be accessed by the device 1400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1404, removable storage 1408, and non-removable storage 1410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1400. Any such computer storage media may be part of computing device 1400.

Computing device 1400 may contain communication connection(s) 1412 that allow the device to communicate with other devices. Computing device 1400 may also have input device(s) 1414 such as a keyboard, mouse, pen, voice input device, touch input device, etc. Output device(s) 1416 such as a display, speakers, printer, etc. may also be included. All these devices are well known in the art and need not be discussed at length here.

In an implementation, a method comprises: identifying an issue in a timeline of a customer, wherein the timeline comprises a plurality of events; determining a cause of the issue; determining an impact of the issue on other customers; and performing escalation management based on the impact.

Implementations include some or all of the following features. The method further comprises retrieving the timeline from storage prior to identifying the issue. The method further comprises generating the timeline prior to identifying the issue. The method further comprises determining an opportunity or a risk associated with the issue. Performing escalation management based on the impact comprises generating and outputting a deliverable for escalation management. The timeline is based on a journey of the customer. The method further comprises analyzing the timeline to identify the issue and determine the cause of the issue. The method further comprises outputting results of the analyzing to a graphical user interface. The method further comprises monitoring procedural changes provided by the escalation management.

In an implementation, a method comprises: identifying an issue in a timeline of a customer, wherein the timeline comprises a plurality of events; providing the timeline and the issue to a user in a graphical user interface of a computing device; receiving notes from the user in the graphical user interface; annotating the timeline with the notes; and performing escalation management based on the issue.

Implementations include some or all of the following features. The method further comprises providing inline collaboration between the user and a subject matter expert (SME) via the computing device and an SME computing device. The method further comprises determining a cause of the issue. The method further comprises determining an impact of the issue on other customers. Determining the impact comprises using journey building. The method further comprises retrieving the timeline from storage prior to identifying the issue. The method further comprises generating the timeline prior to identifying the issue. The method further comprises determining an opportunity or a risk associated with the issue. Performing escalation management comprises generating and outputting a deliverable for escalation management. The timeline is based on a journey of the customer.

In an implementation, a method comprises: providing a first timeline to a computing device, wherein the first timeline comprises a first plurality of events; providing a second timeline to the computing device, wherein the second timeline comprises a second plurality of events; comparing the first timeline with the second timeline to determine a shared incident; determining a cause of the shared incident; determining a remedial action; and outputting the remedial action.

Implementations include some or all of the following features. The first timeline is of a first customer, and the second timeline is of a second customer different than the first customer. The method further comprises receiving the first timeline and the second timeline from storage. Providing the first timeline and the second timeline comprises displaying the first timeline and the second timeline in a graphical user interface of the computing device. Determining the cause of the shared incident comprising determining one or more patterns in the first timeline and the second timeline that led to the shared incident. The method further comprises analyzing the shared incident with respect to at least one additional timeline. The at least one additional timeline is of an additional customer different than the first customer and the second customer.

In an implementation, a method comprises: retrieving data comprising at least one of an event from a customer timeline, information from a customer timeline, patterns from customer timelines, events from patterns of customer timelines, or issues related to patterns of customer timelines; building a journey using the retrieved data; and outputting the journey.

Implementations include some or all of the following features. The method further comprises determining a risk or an opportunity based on the journey. The method further comprises outputting the risk or the opportunity. The method further comprises determining an impact of the journey on other customers. The method further comprises performing escalation management based on the journey. The method further comprises receiving the data from storage. Building the journey is performed by a user via a graphical user interface. The method further comprises a user adding an event to the journey.

In an implementation, a system comprises: at least one processor; and a memory storing instructions that when executed by the at least one processor cause the at least one processor to: identify an issue in a timeline of a customer, wherein the timeline comprises a plurality of events; determine a cause of the issue; determine an impact of the issue on other customers; and perform escalation management based on the impact.

Implementations may include some or all of the following features. The instructions may further include instructions that when executed by the at least one processor cause the at least one processor to retrieve the timeline from storage prior to identifying the issue. The instructions may further include instructions that when executed by the at least one processor cause the at least one processor to generate the timeline prior to identifying the issue. The instructions may further include instructions that when executed by the at least one processor cause the at least one processor to determine an opportunity or a risk associated with the issue. Performing escalation management based on the impact comprises generating and outputting a deliverable for escalation management. The timeline is based on a journey of the customer. The instructions may further include instructions that when executed by the at least one processor cause the at least one processor to analyze the timeline to identify the issue and determine the cause of the issue. The instructions may further include instructions that when executed by the at least one processor cause the at least one processor to output results of the analyzing to a graphical user interface. The instructions may further include instructions that when executed by the at least one processor cause the at least one processor to monitor procedural changes provided by the escalation management.

In an implementation, a system comprises: at least one processor; and a memory storing instructions that when executed by the at least one processor cause the at least one processor to: identify an issue in a timeline of a customer, wherein the timeline comprises a plurality of events; provide the timeline and the issue to a user in a graphical user interface of a computing device; receive notes from the user in the graphical user interface; annotate the timeline with the notes; and perform escalation management based on the issue.

Implementations may include some or all of the following features. The instructions may further include instructions that when executed by the at least one processor cause the at least one processor to provide inline collaboration between the user and a subject matter expert (SME) via the computing device and an SME computing device. The instructions may further include instructions that when executed by the at least one processor cause the at least one processor to determine a cause of the issue. The instructions may further include instructions that when executed by the at least one processor cause the at least one processor to determine an impact of the issue on other customers. Determining the impact comprises using journey building. The instructions may further include instructions that when executed by the at least one processor cause the at least one processor to retrieve the timeline from storage prior to identifying the issue. The instructions may further include instructions that when executed by the at least one processor cause the at least one processor to generate the timeline prior to identifying the issue. The instructions may further include instructions that when executed by the at least one processor cause the at least one processor to determine an opportunity or a risk associated with the issue. Performing escalation management comprises generating and outputting a deliverable for escalation management. The timeline is based on a journey of the customer.

In an implementation, a system comprises: at least one processor; and a memory storing instructions that when executed by the at least one processor cause the at least one processor to: provide a first timeline to a computing device, wherein the first timeline comprises a first plurality of events; provide a second timeline to the computing device, wherein the second timeline comprises a second plurality of events; compare the first timeline with the second timeline to determine a shared incident; determine a cause of the shared incident; determine a remedial action; and output the remedial action.

Implementations may include some or all of the following features. The first timeline is of a first customer, and the second timeline is of a second customer different than the first customer. The instructions may further include instructions that when executed by the at least one processor cause the at least one processor to receive the first timeline and the second timeline from storage. Providing the first timeline and the second timeline comprises displaying the first timeline and the second timeline in a graphical user interface of the computing device. Determining the cause of the shared incident comprising determining one or more patterns in the first timeline and the second timeline that led to the shared incident. The instructions may further include instructions that when executed by the at least one processor cause the at least one processor to analyze the shared incident with respect to at least one additional timeline. The at least one additional timeline is of an additional customer different than the first customer and the second customer.

In an implementation, a system comprises: at least one processor; and a memory storing instructions that when executed by the at least one processor cause the at least one processor to: retrieve data comprising at least one of an event from a customer timeline, information from a customer timeline, patterns from customer timelines, events from patterns of customer timelines, or issues related to patterns of customer timelines; build a journey using the retrieved data; and output the journey.

Implementations may include some or all of the following features. The instructions may further include instructions that when executed by the at least one processor cause the at least one processor to determine a risk or an opportunity based on the journey. The instructions may further include instructions that when executed by the at least one processor cause the at least one processor to output the risk or the opportunity. The instructions may further include instructions that when executed by the at least one processor cause the at least one processor to determine an impact of the journey on other customers. The instructions may further include instructions that when executed by the at least one processor cause the at least one processor to perform escalation management based on the journey. The instructions may further include instructions that when executed by the at least one processor cause the at least one processor to receive the data from storage. Building the journey is performed by a user via a graphical user interface. The instructions may further include instructions that when executed by the at least one processor cause the at least one processor to add an event to the journey.

In an implementation, a system comprises: an issue identification engine configured to identify an issue in a timeline of a customer, wherein the timeline comprises a plurality of events; a timeline analysis engine configured to determine a cause of the issue; an impact determination engine configured to determine an impact of the issue on other customers; and an escalation management engine configured to perform escalation management based on the impact.

In an implementation, a system comprises: an issue identification engine configured to identify an issue in a timeline of a customer, wherein the timeline comprises a plurality of events, and to provide the timeline and the issue to a user in a graphical user interface of a computing device; a note taking engine configured to receive notes from the user in the graphical user interface; a timeline analysis engine configured to annotate the timeline with the notes; and an escalation management engine configured to perform escalation management based on the issue.

In an implementation, a system comprises: a computing device configured to receive a first timeline, wherein the first timeline comprises a first plurality of events, and to receive a second timeline, wherein the second timeline comprises a second plurality of events; a timeline analysis engine configured to compare the first timeline with the second timeline to determine a shared incident, and to determine a cause of the shared incident; and an escalation management engine configured to determine a remedial action, and to output the remedial action.

In an implementation, a system comprises: a timeline analysis engine configured to retrieve data comprising at least one of an event from a customer timeline, information from a customer timeline, patterns from customer timelines, events from patterns of customer timelines, or issues related to patterns of customer timelines; and a journey building engine configured to build a journey using the retrieved data, and to output the journey.

As used herein, the terms "can," "may," "optionally," "can optionally," and "may optionally" are used interchangeably and are meant to include cases in which the condition occurs as well as cases in which the condition does not occur.

It should be understood that the various techniques described herein may be implemented in connection with hardware components or software components or, where appropriate, with a combination of both. Illustrative types of hardware components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for identifying remedial action for a shared timeline event within a contact center environment among one or more customers, the method comprising:

accessing, by a computing device, a first customer timeline stored in a database, wherein the first customer timeline includes a first plurality of events, and wherein each event comprises a timestamp, a specified type, and at least one customer associated with it;

accessing, by the computing device, a second customer timeline stored in the database, wherein the second customer timeline includes a second plurality of events, and wherein each event comprises a timestamp, a specified type, and at least one customer associated with it;

displaying, by the computing device, the first customer timeline together with the second customer timeline on a graphical user interface;

comparing, by the computing device, the first customer timeline with the second customer timeline to identify a shared event that is common to the first customer timeline and the second customer timeline;

connecting, by the computing device, the shared event common to the first customer timeline and the second customer timeline by specifying shared customers and the relative position in time on the respective timelines via the timestamp associated with the event;

analyzing, by the computing device, the shared event to determine whether a pattern in the first customer timeline and the second customer timeline led to the shared event, wherein the analyzing further comprises:

investigating each customer history and transcripts, and applying natural language processing to the transcripts to identify contextual data;

identifying, by an escalation management engine of the computing device, the shared event as a problematic shared event as a function of a machine learning model of a machine learning system, wherein the machine learning model continually learns statistical characteristics of events and event patterns denoted as problematic;

identifying and outputting, by the escalation management engine of the computing device, a remedial action configured to address a cause of a remedial issue associated with the problematic shared event;

applying, by the escalation management engine of the computing device, the remedial action configured to address the cause of the remedial issue associated with the problematic shared event, wherein the applying comprises identifying opportunities to guide an interaction towards a better outcome by creating deliverables from the shared timeline event; and improving an accuracy of the machine learning model by incorporating into the machine learning model interactions provided via the graphical user interface with an output of the machine learning model, including a determination of an impact of the problematic shared event, wherein the impact is representative of a quantity of the customers that experienced the problematic shared event and an effect of the problematic shared event on one or more key performance indicators, to reinforce accurate identification, by the machine learning model, of problematic events and suppress future inaccuracies by the machine learning model.

2. The method of claim 1, wherein the first customer timeline is of a first customer, and the second customer timeline is of a second customer, wherein the first customer is different than the second customer.

3. The method of claim 1, further comprising receiving the first customer timeline and the second customer timeline from a database.

4. The method of claim 1, further comprising analyzing the shared event with respect to at least one additional customer timeline.

5. The method of claim 4, wherein the at least one additional customer timeline is selected from a third customer, wherein the third customer is different from both of the first and the second customers.

6. The method of claim 1, further comprising pinning a user-entered note about one or more of the first customer timeline or the second customer timeline to an event of the one or more of the first customer timeline or the second customer timeline displayed on the graphical user interface.

7. The method of claim 6, wherein the user-entered note denotes a root cause of a problematic event.

8. The method of claim 6, wherein the user-entered note assigns a task to another user in relation to one or more of the first customer timeline or the second customer timeline.

9. The method of claim 6, wherein the graphical user interface comprises a button that allows a user to toggle through user-entered notes about the one or more of the first customer timeline or the second customer timeline in sequence.

10. The method of claim 1, further comprising determining a scale of a problem associated with the shared event by comparing the pattern that led to the shared event to each other customer timeline of a plurality of other customer timelines stored for a contact center system.

11. The method of claim 1, wherein the first customer timeline and the second customer timeline are scaled to allow comparison of an order of events and respective relative positions in time of the events across the first customer timeline and the second customer timeline.

12. The method of claim 1, wherein the graphical user interface comprises an interface element that allows a user to modify the one or more of the first customer timeline or the second customer timeline to add an event selected from a library of stored events.

* * * * *